US012732677B2

(12) United States Patent
Kameyama

(10) Patent No.: US 12,732,677 B2
(45) Date of Patent: Sep. 8, 2026

(54) VEHICULAR CAMERA

(71) Applicant: Panasonic Automotive Systems Co., Ltd., Kanagawa (JP)

(72) Inventor: Shingo Kameyama, Hyogo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 34 days.

(21) Appl. No.: 18/918,897

(22) Filed: Oct. 17, 2024

(65) Prior Publication Data

US 2025/0133281 A1 Apr. 24, 2025

(30) Foreign Application Priority Data

Oct. 19, 2023 (JP) ................................ 2023-180360

(51) Int. Cl.

| | |
|---|---|
| ***H04N 23/51*** | (2023.01) |
| ***B60R 1/28*** | (2022.01) |
| ***H04N 23/54*** | (2023.01) |
| ***H04N 23/55*** | (2023.01) |
| ***H04N 23/57*** | (2023.01) |

(52) U.S. Cl.

CPC ............... *H04N 23/51* (2023.01); *B60R 1/28* (2022.01); *H04N 23/54* (2023.01); *H04N 23/55* (2023.01); *H04N 23/57* (2023.01); *B60R 2300/105* (2013.01)

(58) Field of Classification Search

CPC ........ H04N 23/51; H04N 23/54; H04N 23/55; H04N 23/57; H04N 23/52; B60R 1/28; B60R 2300/105; G03B 17/02; G03B 17/12; G03B 17/55; G03B 30/00; G02B 7/021

See application file for complete search history.

(56) References Cited

U.S. PATENT DOCUMENTS

| | | | | |
|---|---|---|---|---|
| 10,979,611 | B2 | 4/2021 | Byrne et al. | |
| 11,617,021 | B2 | 3/2023 | Byrne et al. | |
| 12,504,682 | B2 * | 12/2025 | Nakamura | G03B 30/00 |
| 2022/0360691 | A1 | 11/2022 | Dreiocker et al. | |
| 2023/0100251 | A1 * | 3/2023 | Tokito | G03B 30/00 348/148 |
| 2023/0116237 | A1 * | 4/2023 | Owaki | G01S 7/4813 348/294 |
| 2024/0073498 | A1 * | 2/2024 | Tanaka | H04N 23/51 |
| 2024/0305872 | A1 * | 9/2024 | Nakamura | H04N 23/52 |
| 2025/0039522 | A1 * | 1/2025 | Harada | H04N 23/51 |
| 2025/0039526 | A1 * | 1/2025 | Nakamura | H04N 23/57 |

* cited by examiner

*Primary Examiner* — Shahbaz Nazrul

(74) *Attorney, Agent, or Firm* — Seed Intellectual Property Law Group LLP

(57) ABSTRACT

A vehicular camera includes a groove portion disposed between a flange portion of a lens unit and a housing protruding portion of a housing and including a bottom surface, first and second side surfaces. The bottom surface of the groove portion has a part of the first flange protruding surface of the flange protruding portion. The first side surface of the groove portion has a part of the flange end surface of the flange portion. The second side surface of the groove portion has a second portion of the inner side surface of the housing protruding portion. The flange protruding end surface of the flange protruding portion is welded to the first portion of the inner side surface of the housing protruding portion, or the second flange protruding surface of the flange protruding portion is welded to the first housing end surface. The vehicular camera includes a resin member.

15 Claims, 24 Drawing Sheets

VEHICULAR CAMERA

TECHNICAL FIELD

The present disclosure relates to a vehicular camera.

BACKGROUND ART

With demands for improvements in vehicle safety, introduction of autonomous driving functions, and the like in recent years, development of vehicular cameras that are mounted on vehicles and capture the inside and outside of the vehicles have become active (for example, see Patent Literatures 1 and 2).

CITATION LIST

Patent Literature

Patent Literature 1: US2022/360691A
Patent Literature 2: U.S. Pat. No. 10,979,611B
Patent Literature 3: U.S. Pat. No. 11,617,021B

SUMMARY OF INVENTION

Required levels relating to safety, automatic driving functions, and the like, which are required for vehicles, are improved, and further improvement in performance and the like are also required for vehicular cameras.

The present disclosure relates to a technique for providing a new vehicular camera.

The present disclosure provides a vehicular camera including a lens unit including a first tubular portion having a first tubular shape, at least one lens disposed inside the first tubular portion and on an optical axis, and a metal flange portion disposed outside the first tubular portion to extend outward with reference to the optical axis over an entire circumference centering on the optical axis; a circuit board including a first surface and a second surface opposite to the first surface; an imaging element disposed on the optical axis and on the first surface of the circuit board; and a metal housing configured to accommodate at least the circuit board and the imaging element and including a second tubular portion having a second tubular shape along the optical axis. The second tubular portion of the housing includes a first end, and a second end that is opposite to the first end and is disposed at a position farther than the first end with reference to the lens unit in a direction of the optical axis. The flange portion of the lens unit includes a first flange surface disposed along the first surface of the circuit board, a second flange surface disposed along the first surface of the circuit board and located closer to the first surface of the circuit board than the first flange surface with reference to the first surface of the circuit board in the direction of the optical axis, a flange end surface connecting the first flange surface and the second flange surface, and a flange protruding portion disposed to extend outward from the flange end surface with reference to the optical axis over the entire circumference centering on the optical axis. The flange protruding portion of the flange portion in the lens unit includes a first flange protruding surface disposed along the first surface of the circuit board, a second flange protruding surface disposed along the first surface of the circuit board and located closer to the first surface of the circuit board than the first flange protruding surface with reference to the first surface of the circuit board in the direction of the optical axis, and a flange protruding end surface connecting the first flange protruding surface and the second flange protruding surface. The first end of the housing includes a first housing end surface disposed along the first surface of the circuit board, and a housing protruding portion protruding in a direction away from the first housing end surface with reference to the second end of the housing. The housing protruding portion has a second housing end surface at a top portion, the flange protruding end surface of the flange protruding portion of the flange portion faces a first portion of an inner side surface of the housing protruding portion of the housing, and the second flange protruding surface of the flange protruding portion of the flange portion faces the first housing end surface of the housing. The vehicular camera includes a groove portion that is disposed between the flange portion and the housing protruding portion of the first end of the housing over the entire circumference centering on the optical axis and includes a bottom surface, a first side surface, and a second side surface. The bottom surface of the groove portion has at least a part of the first flange protruding surface of the flange protruding portion of the flange portion, the first side surface of the groove portion has at least a part of the flange end surface of the flange portion, and the second side surface of the groove portion has at least a second portion of the inner side surface of the housing protruding portion of the first end of the housing, the second portion being farther from the first portion with reference to the second end of the housing. The flange protruding end surface of the flange protruding portion of the flange portion is welded to the first portion of the inner side surface of the housing protruding portion of the first end of the housing, and/or the second flange protruding surface of the flange protruding portion of the flange portion is welded to the first housing end surface of the first end of the housing. The vehicular camera includes a resin member configured to cover at least the bottom surface of the groove portion, a part of the first side surface of the groove portion, and a part of the second side surface of the groove portion over the entire circumference centering on the optical axis.

Further, the present disclosure provides a vehicular camera including a first housing including a tubular lens barrel having at least one lens; a circuit board having a first surface and a second surface opposite to the first surface; an imaging element disposed on the first surface of the circuit board and on an optical axis of the at least one lens; a second housing configured to accommodate at least the circuit board and the imaging element; and a welded portion at which a part of the first housing and a part of the second housing are welded. The welded portion is covered with a resin.

According to the present disclosure, performance such as heat dissipation and noise resistance is improved by adopting the lens unit including the metal flange portion and the metal housing in the vehicular camera. Further, since the resin member covers at least a part of the groove portion formed between the flange portion and the housing protruding portion of the housing over the entire circumference, excellent environmental resistance and appearance quality can be ensured.

DESCRIPTION OF EMBODIMENTS

Hereinafter, an embodiment that specifically discloses a vehicular camera according to the present disclosure will be described in detail with reference to the drawings as appropriate. However, unnecessarily detailed descriptions may be omitted. For example, detailed descriptions of already well-known matters and redundant descriptions of substantially the same configuration may be omitted. This is to avoid unnecessary redundancy of the following description and facilitate understanding of those skilled in the art. It should be noted that the accompanying drawings and the following description are provided for those skilled in the art to sufficiently understand the present disclosure, and are not intended to limit the subject matter described in the claims.

(Vehicle on which Vehicular Camera is Mounted)

Figure 1:
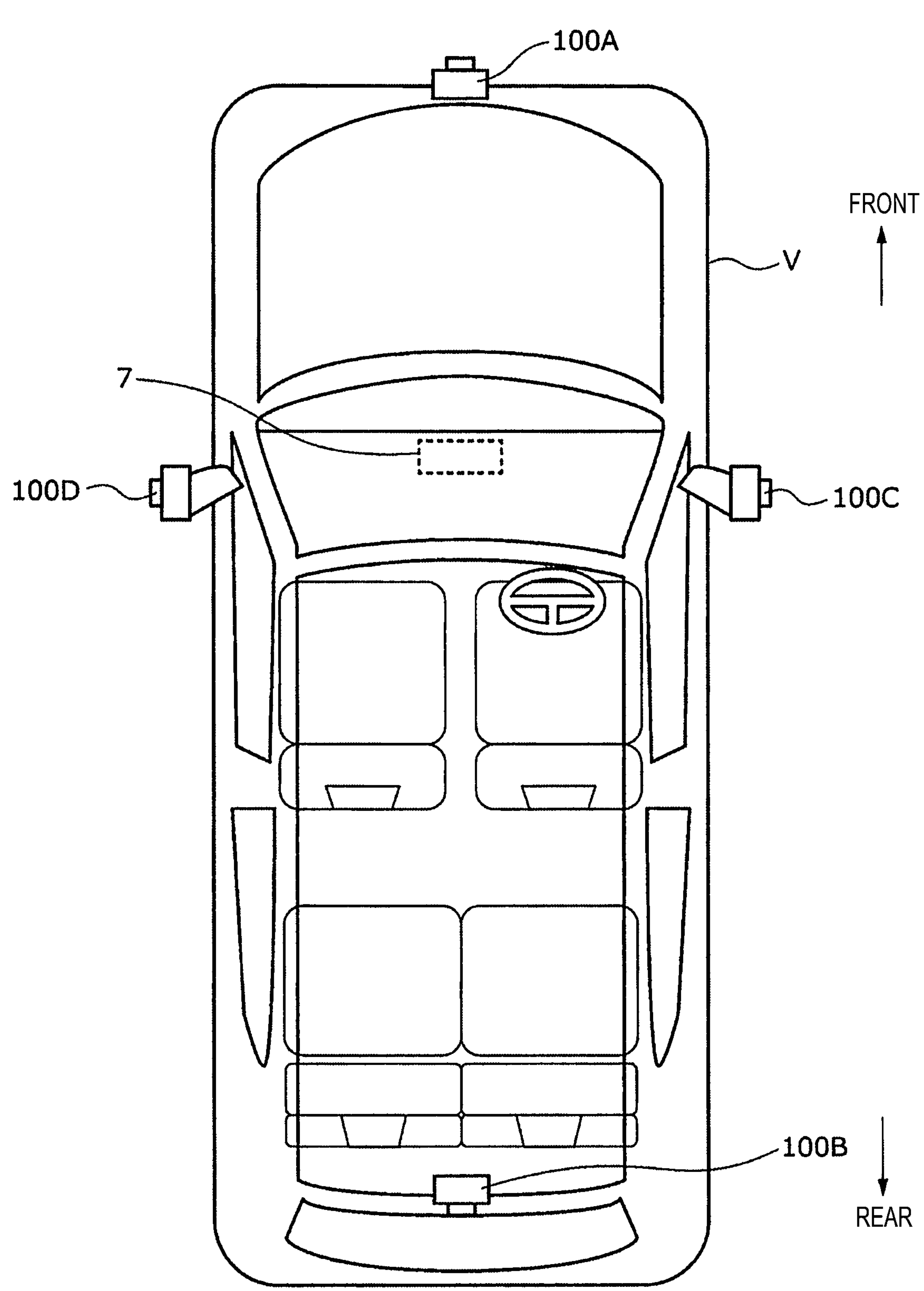
FIG. 1 is an example of a vehicle, and is a top view of the vehicle on which vehicular cameras are mounted.

FIG. 1 is an example of a vehicle, and is a top view of the vehicle on which vehicular cameras are mounted. As a vehicular camera 100, a vehicular camera 100A, a vehicular camera 100B, a vehicular camera 100C, and a vehicular camera 100D are mounted on a vehicle V. The vehicular camera 100A is a front camera, the vehicular camera 100B is a rear camera, the vehicular camera 100C is a right side camera, and the vehicular camera 100D is a left side camera. The vehicular cameras 100A to 100D are, for example, wide-angle cameras having an angle of view of about 180°, and are disposed to capture images showing an entire periphery of the vehicle V.

For example, the vehicular camera 100A is provided in a front grille of the vehicle V, and captures an image of a front region in a direction of looking down obliquely with respect to the ground. The vehicular camera 100B is provided in a roof spoiler of the vehicle V, and captures an image of a rear region in a direction of looking down obliquely with respect to the ground. The vehicular camera 100C and the vehicular camera 100D are provided in side mirrors of the vehicle V, and capture images of lateral regions in directions of looking down obliquely with respect to the ground, respectively.

Figure 2:
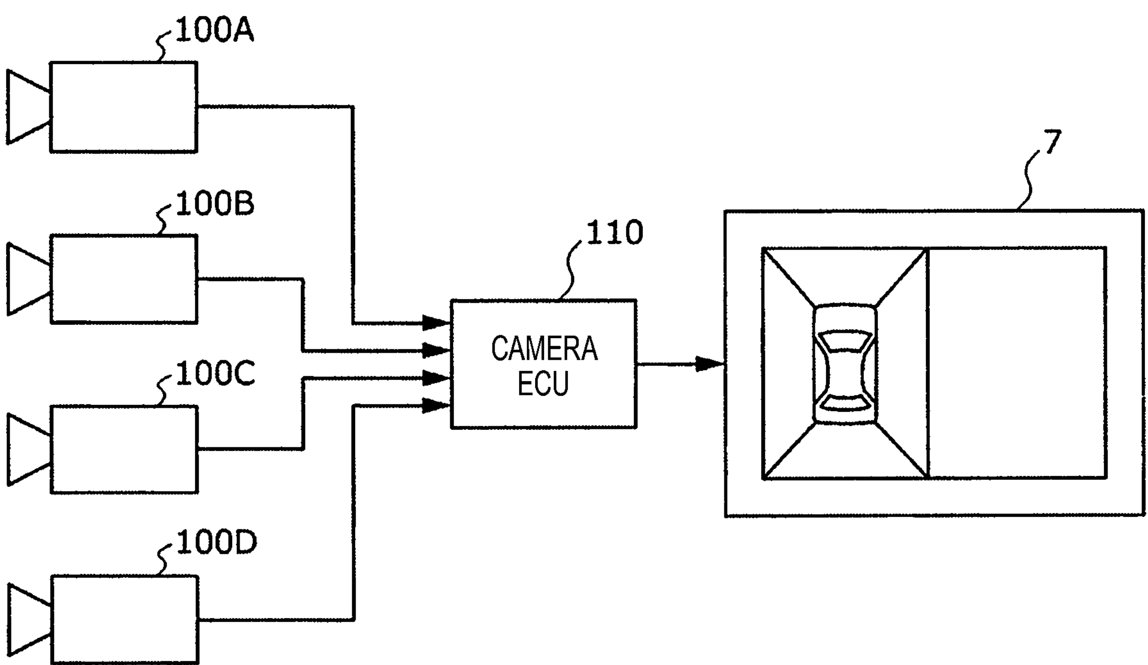
FIG. 2 is a block diagram illustrating a connection example of the vehicular cameras provided in the vehicle shown in FIG. 1, a camera ECU, and a display.

FIG. 2 is a block diagram illustrating a connection example of the vehicular cameras 100A to 100D provided in the vehicle V shown in FIG. 1, a camera ECU 110, and a display 7. The camera electronic control unit (ECU) 110 in FIG. 2 synthesizes the images captured by the vehicular cameras 100A to 100D, and displays a synthesized image on the display 7 of a navigation system disposed on an instrument panel, for example. An occupant can visually recognize the display 7 and check a situation around the vehicle V.

Figure 3:
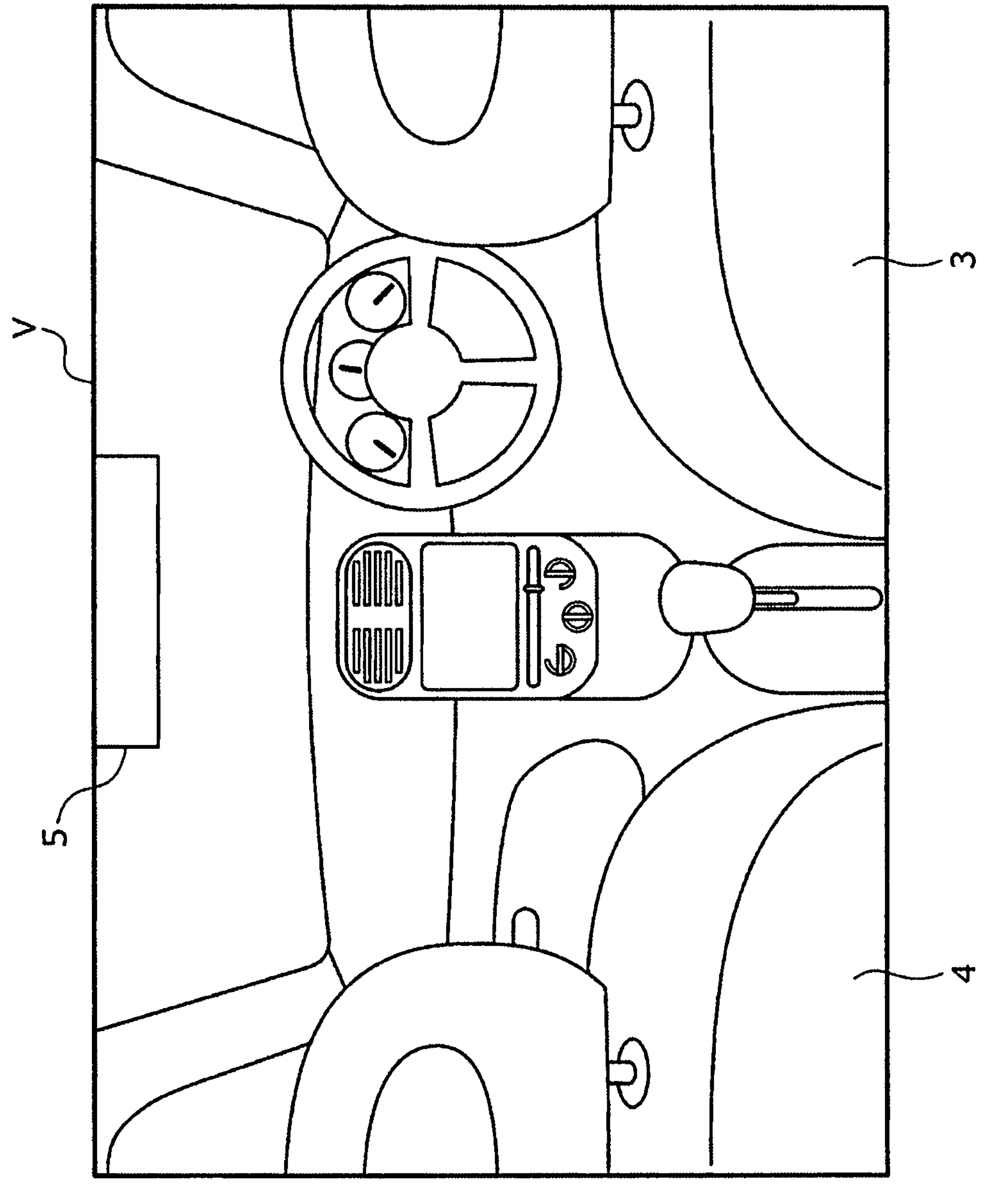
FIG. 3 is another example of the vehicle, and is a schematic diagram of a cabin of the vehicle on which a vehicular camera is mounted.
Figure 4:
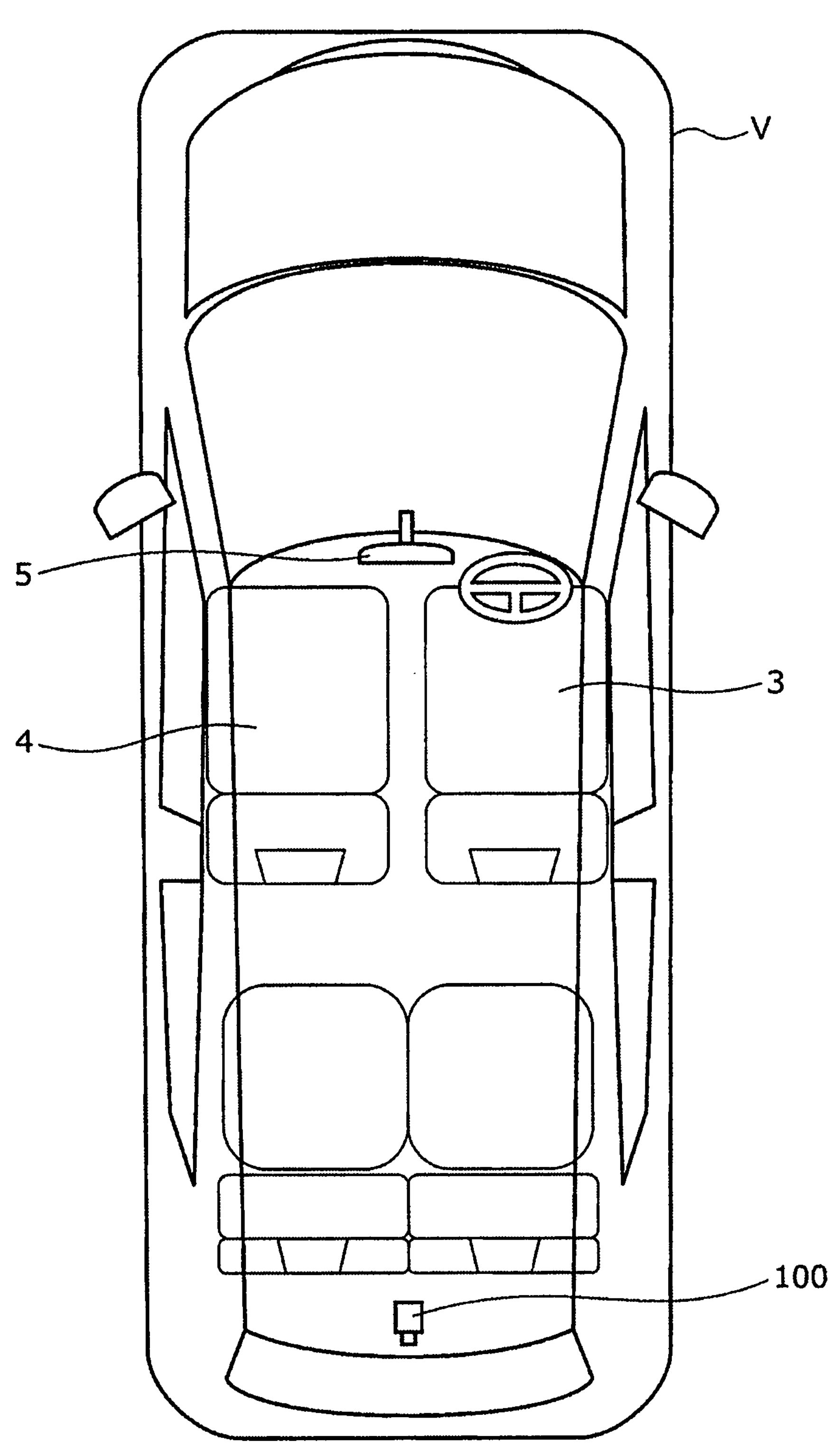
FIG. 4 is a top view of the vehicle in FIG. 3.
Figure 5:
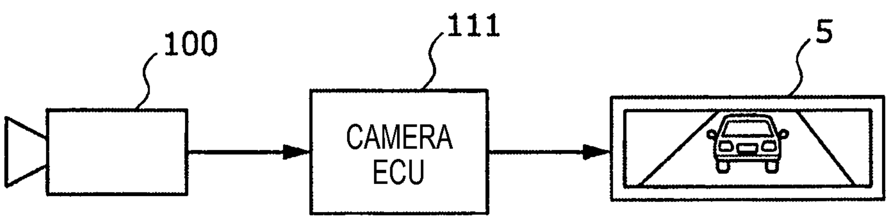
FIG. 5 is a block diagram illustrating a connection example of the vehicular camera provided in the vehicle shown in FIG. 3, a camera ECU, and a display device.

FIG. 3 is another example of the vehicle, and is a schematic diagram of a cabin of the vehicle on which the vehicular camera is mounted, and FIG. 4 is a top view of the vehicle in FIG. 3. The vehicle V includes a display device 5 (for example, an electronic rearview mirror) at an attachment position of a rearview mirror which is a front portion between a driver's seat 3 and a passenger seat 4 in a cabin 2. Further, the vehicle Vis provided with the vehicular camera 100 at a rear side of a vehicle body. FIG. 5 is a block diagram illustrating a connection example of the vehicular camera 100 provided in the vehicle V shown in FIG. 3, a camera ECU 111, and the display device 5. The camera electronic control unit (ECU) 111 in FIG. 4 processes an image captured by the vehicular camera 100, and the display device 5 displays the image. The occupant can visually recognize the display device 5 and check a rear situation of the vehicle V.

First Embodiment

Figure 6:
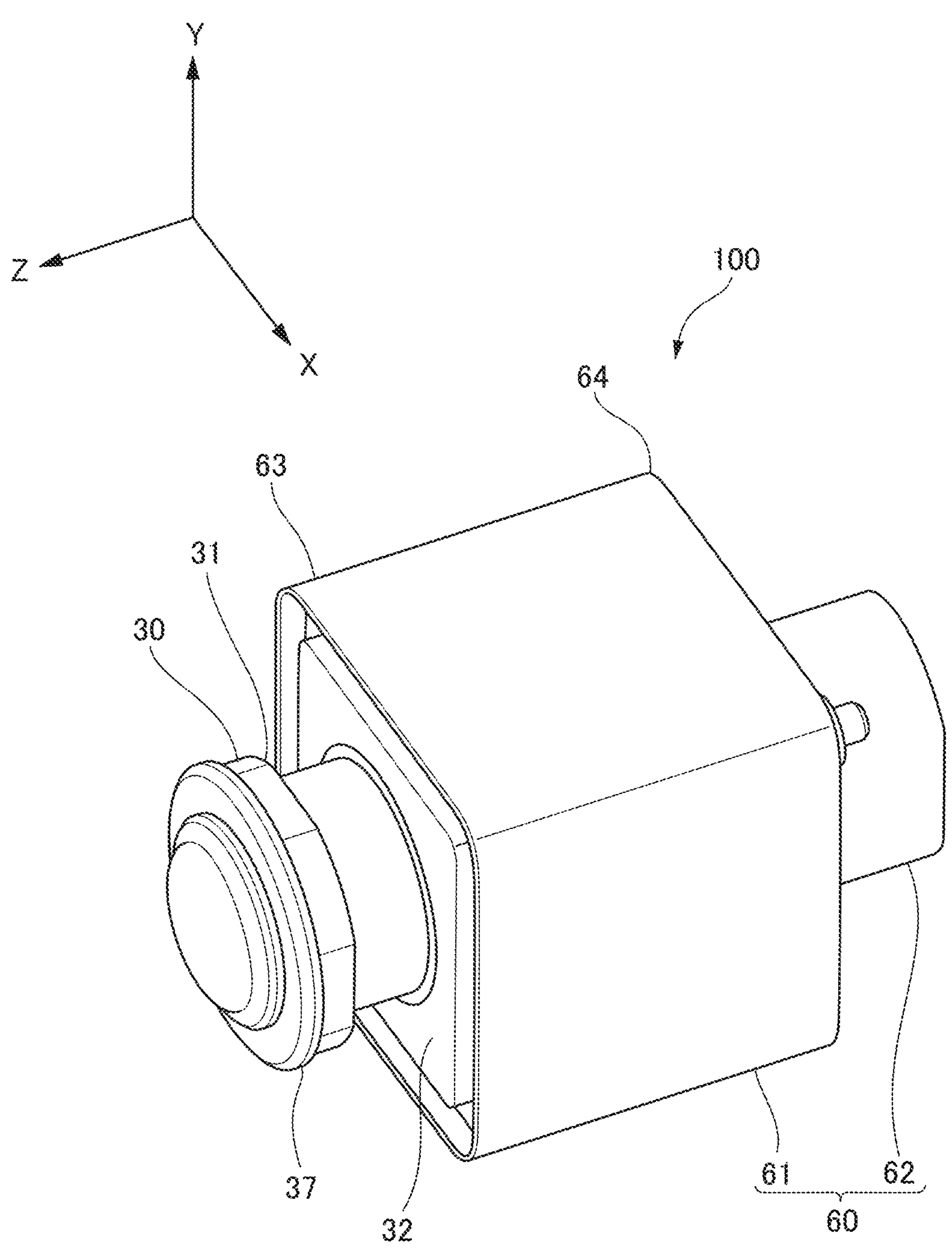
FIG. 6 is a perspective view of a vehicular camera according to a first embodiment.
Figure 7:
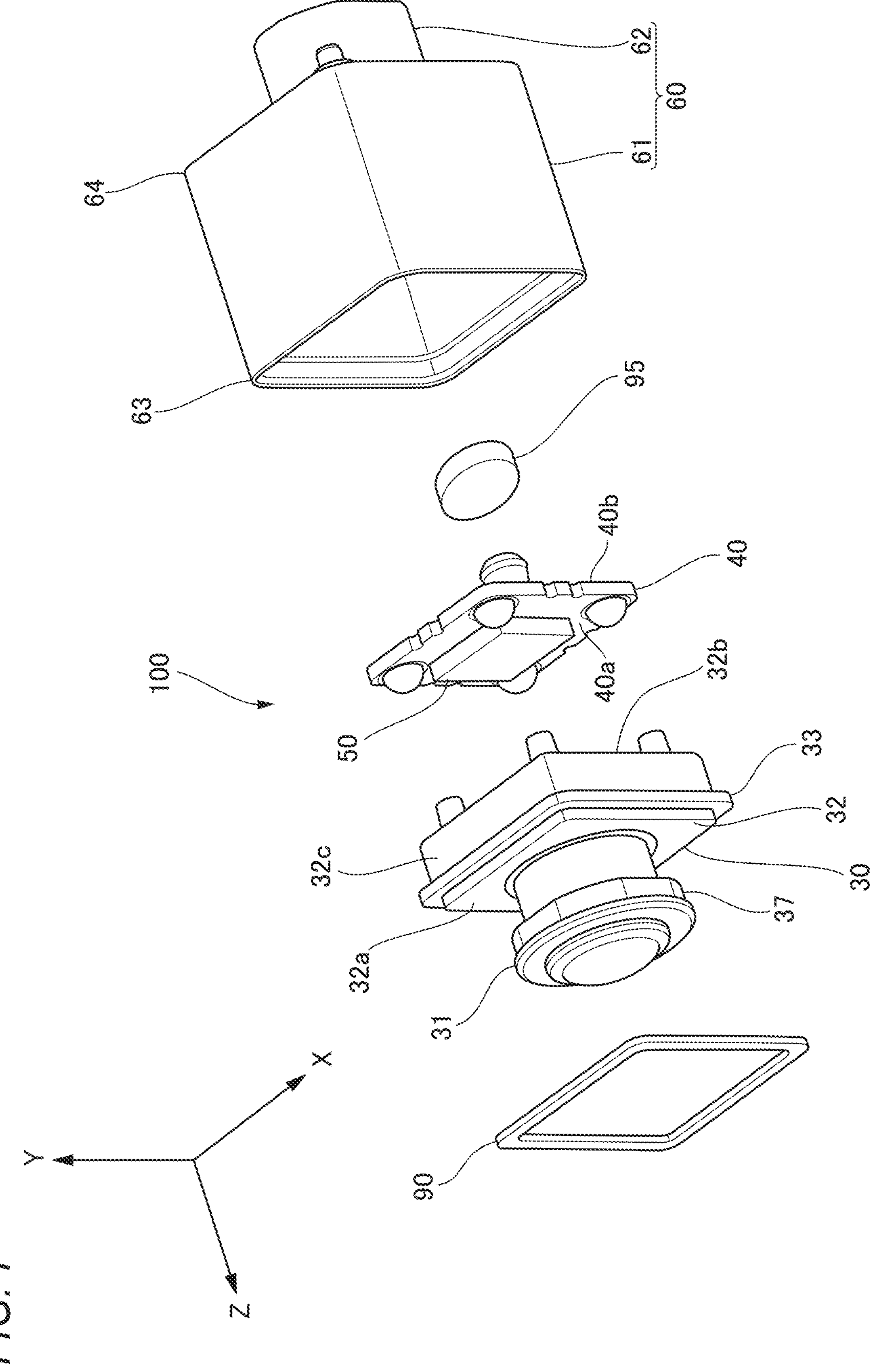
FIG. 7 is an exploded perspective view of the vehicular camera according to the first embodiment.
Figure 8:
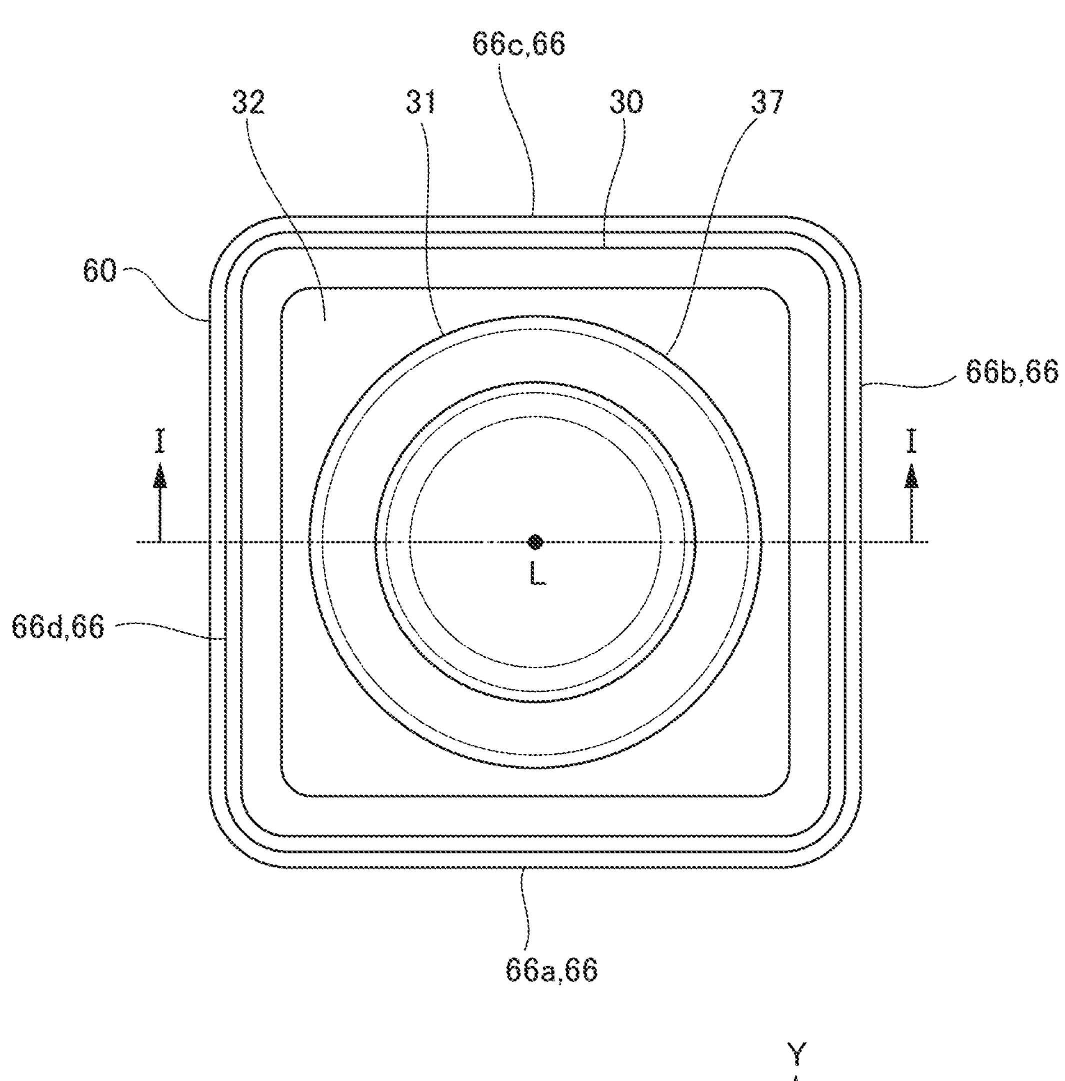
FIG. 8 is a top view of the vehicular camera according to the first embodiment.
Figure 8:
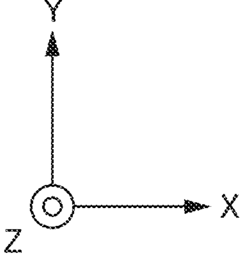
Figure 9:
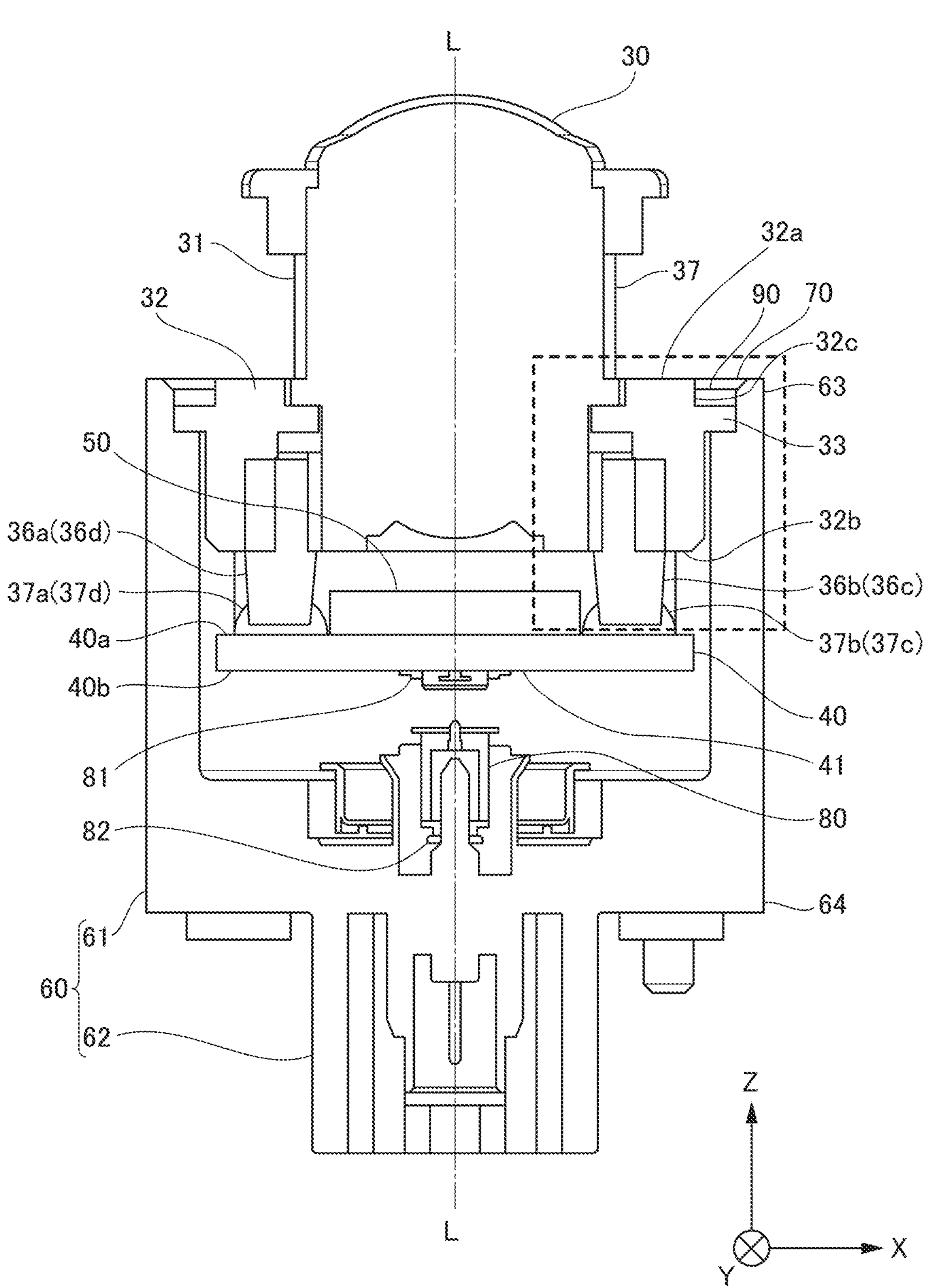
FIG. 9 is a cross-sectional view taken along a line I-I in FIG. 8.
Figure 10:
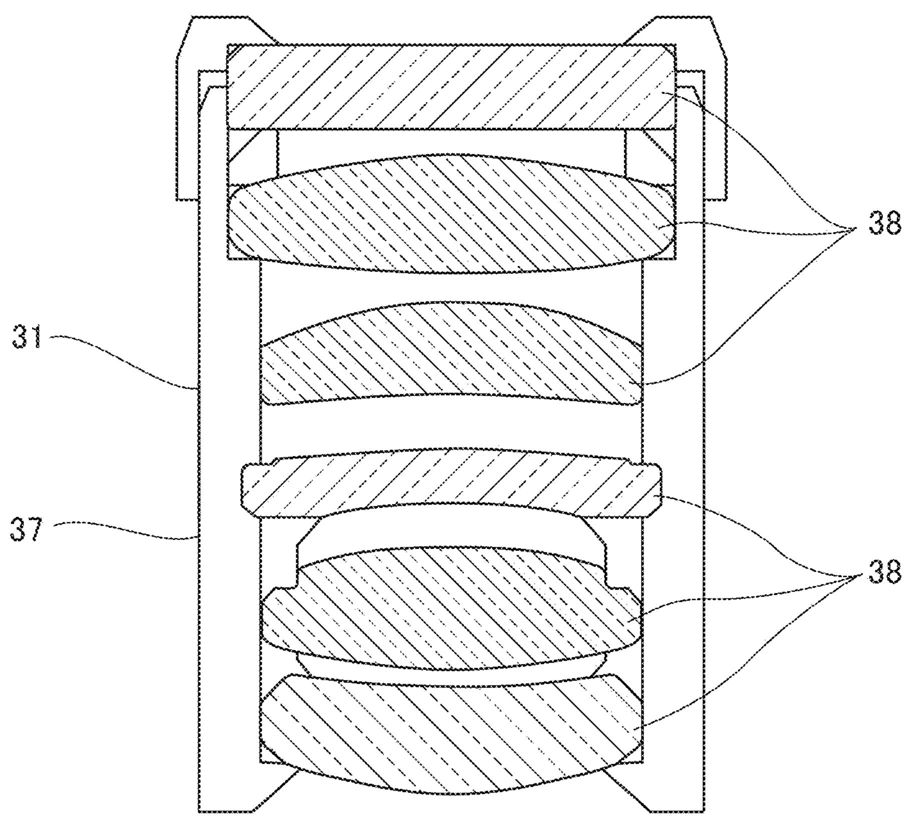
FIG. 10 is a cross-sectional view of a first tubular portion of a lens unit.
Figure 10:
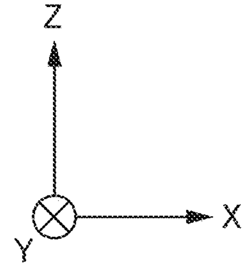

FIG. 6 is a perspective view of the vehicular camera 100 according to a first embodiment. FIG. 7 is an exploded perspective view of the vehicular camera 100 according to the first embodiment. FIG. 8 is a top view of the vehicular camera 100 according to the first embodiment. FIG. 9 is a cross-sectional view taken along a line I-I in FIG. 8. FIG. 10 is a cross-sectional view of a first tubular portion 37 of a lens unit 30. Coordinates including an X axis along one side of the vehicular camera 100, a Y axis orthogonal to the X axis and along another side of the vehicular camera 100, and a Z axis orthogonal to the X axis and the Y axis and along a height direction of the vehicular camera 100 are defined, and are used in the following description.

The vehicular camera 100 according to the present embodiment includes the lens unit 30, a circuit board 40, an imaging element 50, a housing 60, and a resin member 90.

The lens unit 30 includes the first tubular portion 37 that constitutes a lens barrel 31 having a tubular shape and has a first tubular shape, and at least one lens 38 disposed inside the first tubular portion 37 and on an optical axis L. The first tubular portion 37 has a tubular shape, and holds a lens group including, for example, a plurality of lenses 38 inside the first tubular portion 37 as shown in FIG. 10. The respective lenses 38 in the lens group are arranged in a state in which respective optical axes L are aligned with each other, and constitute the lens group used for capturing images of the inside and outside of the vehicle body of the vehicle V.

Further, the lens unit 30 has a flange portion 32 disposed outside the first tubular portion 37 to extend outward with reference to the optical axis L over an entire circumference centering on the optical axis L, and the flange portion 32 is made of metal.

The flange portion 32 has a first flange surface 32*a*, a second flange surface 32*b* opposite to the first flange surface 32*a* and located in an internal space of a large-diameter tubular portion 61 of the housing 60 to be described later, and a flange end surface 32*c* connecting the first flange surface 32*a* and the second flange surface 32*b*.

The circuit board 40 is disposed in the internal space of the housing 60 and has a first surface 40*a* and a second surface 40*b* opposite to the first surface 40*a*. However, two or more circuit boards may be provided.

The flange portion 32 of the lens unit 30 and the circuit board 40 are disposed to be substantially parallel to each other. That is, the first flange surface 32*a* of the flange portion 32 is disposed along the first surface 40*a* of the circuit board 40. The second flange surface 32*b* is also disposed along the first surface 40*a* of the circuit board 40, and is located closer to the first surface 40*a* of the circuit board 40 than the first flange surface 32*a* in a direction of the optical axis L with reference to the first surface 40*a* of the circuit board 40.

The imaging element 50 is disposed on the first surface 40*a* of the circuit board 40 and on the optical axis L of at least one lens of the lens units 30. By guiding light from the outside to the imaging element 50, the imaging element 50 can capture an image.

The housing 60 is a tubular member having the internal space, and supports the lens unit 30 and accommodates at least the circuit board 40 and the imaging element 50. The housing 60 has the large-diameter tubular portion 61 having a second tubular shape along the optical axis L, and a small-diameter tubular portion 62 along the optical axis L. In an XY plane, the large-diameter tubular portion 61 constituting a second tubular portion has a larger cross-sectional area than the small-diameter tubular portion 62, and has a rectangular cross section. The large-diameter tubular portion 61 accommodates at least the circuit board 40 and the imaging element 50 therein. The small-diameter tubular portion 62 mainly accommodates an electrical connector 80 that secures electrical connection with the outside of the vehicular camera 100. The large-diameter tubular portion 61 and the small-diameter tubular portion 62 may be integrally formed by a resin to be described later, and the large-diameter tubular portion 61 and the small-diameter tubular portion 62 prepared individually in advance may be joined by a method such as welding or screwing. In the present embodiment, the housing 60 has a rectangular tubular shape, but is not limited thereto, and may have a polygonal tubular shape other than the rectangular tubular shape, a circular or elliptical tubular shape, or other tubular shapes.

The large-diameter tubular portion 61 has a first end 63 and a second end 64 that is opposite to the first end 63 and disposed at a position farther from the first end 63 with reference to the lens unit 30 in the direction of the optical axis L. At least the large-diameter tubular portion 61 is made of metal.

Next, the flange portion 32 of the lens unit 30 will be described again. The flange portion 32 includes a flange protruding portion 33 disposed to extend outward from the flange end surface 32*c* with reference to the optical axis L over an entire circumference centering on the optical axis L.

Figure 11:
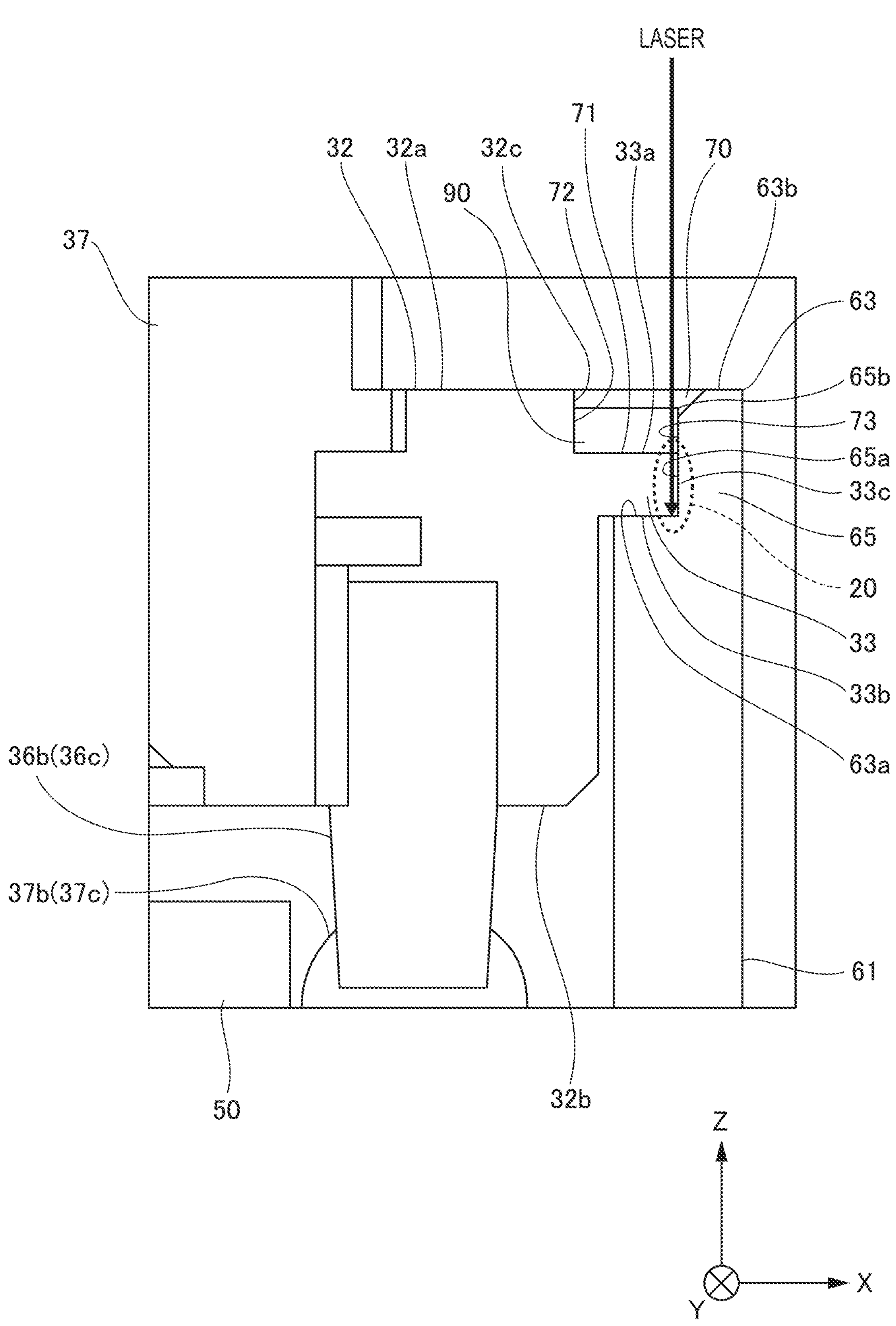
FIG. 11 is an enlarged view of a portion within a frame of FIG. 9, showing an example of a laser irradiation method.

The flange protruding portion 33 has a first flange protruding surface 33*a*, a second flange protruding surface 33*b*, and a flange protruding end surface 33*c* (see FIG. 11). The first flange protruding surface 33*a* is disposed along the first surface 40*a* of the circuit board 40. The second flange protruding surface 33*b* is disposed along the first surface 40*a* of the circuit board 40, and is located closer to the first surface 40*a* of the circuit board 40 than the first flange protruding surface 33*a* in the direction of the optical axis L with reference to the first surface 40*a* of the circuit board 40. The flange protruding end surface 33*c* connects the first flange protruding surface 33*a* and the second flange protruding surface 33*b*.

Next, the first end 63 of the housing 60 will be described again. The first end 63 has a first housing end surface 63*a* and a housing protruding portion 65 (see FIG. 11). The first housing end surface 63*a* is disposed along the first surface 40*a* of the circuit board 40. The housing protruding portion 65 protrudes in a direction away from the first housing end surface 63*a* with reference to the second end 64 of the housing 60. In addition, the housing protruding portion 65 has a second housing end surface 63*b* at a top portion thereof.

A relation between the flange protruding portion 33 of the flange portion 32 and the first end 63 of the housing 60 will be described. The flange protruding end surface 33*c* of the flange protruding portion 33 is an inner side surface of the housing protruding portion 65 and faces a first portion 65*a* which is a part of the inner side surface. The second flange protruding surface 33*b* of the flange protruding portion 33 faces the first housing end surface 63*a*, and at least a part of the flange protruding portion 33 is placed on the first housing end surface 63*a*.

Next, the welding of the flange portion 32 of the lens unit 30 and the first end 63 of the housing 60 will be described. FIG. 11 is an enlarged view of a portion within a frame of FIG. 9, showing an example of a laser irradiation method. The flange portion 32 and the first end 63 are welded by, for example, a laser.

In FIG. 11, specifically, the laser is emitted between the flange protruding end surface 33*c* of the flange protruding portion 33 and the first portion 65*a* of the inner side surface of the opposing housing protruding portion 65, and the flange protruding end surface 33*c* and the first portion 65*a* are welded to form a welded portion 20. Since both the flange protruding end surface 33*c* and the housing protruding portion 65 are made of metal, the laser can melt and firmly weld the flange protruding end surface 33*c* and the housing protruding portion 65 together.

Figure 12:
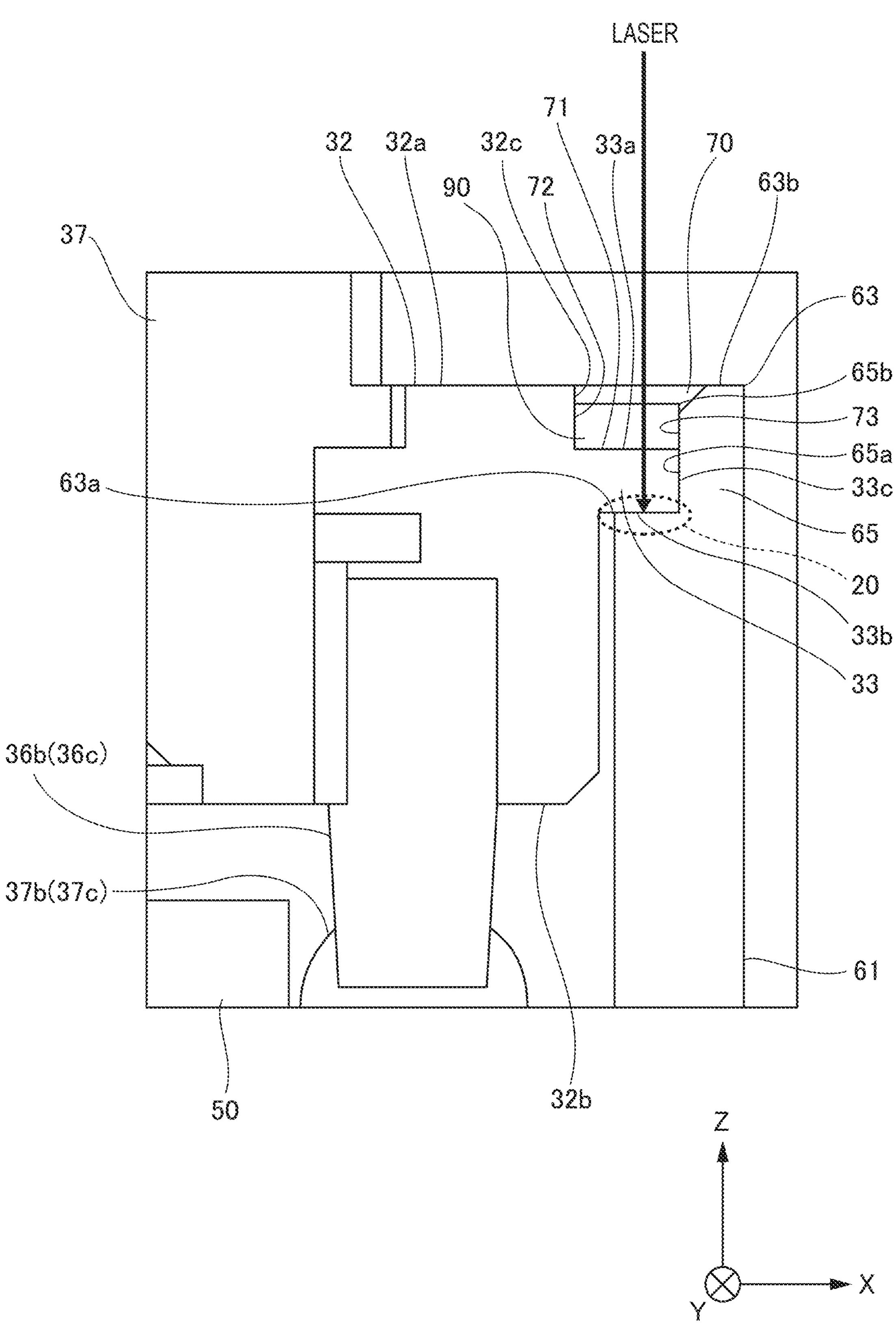
FIG. 12 is the enlarged view of the portion within the frame of FIG. 9, showing another example of the laser irradiation method.

FIG. 12 is the enlarged view of the portion within the frame of FIG. 9, showing another example of the laser irradiation method. In this example, the laser passes through the flange protruding portion 33 and reaches the second flange protruding surface 33*b* and the first housing end surface 63*a* facing the second flange protruding surface 33*b*. Accordingly, while the flange protruding portion 33 is melted, at least the second flange protruding surface 33*b* and the first housing end surface 63*a* are welded to form the welded portion 20. Since the second flange protruding surface 33*b* and the first housing end surface 63*a* are both made of metal, the laser can melt and firmly weld the second flange protruding surface 33*b* and the first housing end surface 63*a* together. The method in FIG. 11 and the method in FIG. 12 may be used in combination.

In the present embodiment, the metal flange portion 32 and the metal housing 60 (at least the large-diameter tubular portion 61 is made of metal) are adopted and welded together, specifically by laser welding, and thus the lens unit 30 and the housing 60 are welded. Since the flange portion 32 and the housing 60 are made of metal, it is possible to improve performance required for the vehicular camera 100, such as heat dissipation of heat generated from the circuit board 40 and the like and noise resistance for blocking noise from the outside.

However, the metal member may cause problems of environmental resistance including corrosion and the like at the welded portion and appearance quality. Therefore, in the present embodiment, these problems are solved by providing a groove portion 70 in a vicinity of the welded portion 20 and disposing the resin member 90 in the groove portion 70.

The groove portion 70 is formed to be disposed over the entire circumference centering on the optical axis L between the flange portion 32 and the housing protruding portion 65 of the first end 63, and includes a bottom surface 71, a first side surface 72, and a second side surface 73. The bottom surface 71 corresponds to a bottom surface facing an opening of the groove portion 70, and includes at least a part of the first flange protruding surface 33*a* of the flange protruding portion 33 of the flange portion 32. The first side surface 72 corresponds to an inner side surface of the groove portion 70 and includes at least a part of the flange end surface 32*c* of the flange portion 32. The second side surface 73 corresponds to an outer side surface of the groove portion 70, and includes at least a second portion 65*b* of the inner side surface of the housing protruding portion 65 of the first end 63, which is farther than the first portion 65*a* with reference to the second end 64 of the housing 60. In the direction of the optical axis L, the second portion 65*b* of the housing protruding portion 65 is located between the first portion 65*a* of the inner side surface of the housing protruding portion 65 and the second housing end surface 63*b*.

The resin member 90 is disposed over the entire circumference of the groove portion 70 centering on the optical axis L. Specifically, the resin member 90 is disposed to cover at least the bottom surface 71, a part of the first side surface 72, and a part of the second side surface 73 of the groove portion 70.

In the vehicular camera 100 of the present embodiment, the resin member 90 covers at least a part of the groove portion 70 formed between the flange portion 32 and the housing protruding portion 65 over the entire circumference. Thus, even when the flange portion 32 and the housing 60 are made of metal, the resin member 90 prevents foreign matters such as moisture from entering an interior of the housing 60, and excellent environmental resistance is ensured. In addition, even when a color of the welded portion 20 is changed by welding, the resin member 90 covers the welded portion 20, so that the appearance quality can be secured. For example, the resin member 90 may be selected such that a color of the resin member 90 matches a color of the flange portion 32 and a color of the housing 60.

The resin member 90 may be formed by filling the groove portion 70 with potting resin and curing the potting resin after welding the flange portion 32 and the housing 60. As shown in FIG. 7, the resin member 90 formed in advance may be disposed and may be bonded to the groove portion 70 with an adhesive or the like.

Second Embodiment

Figure 13:
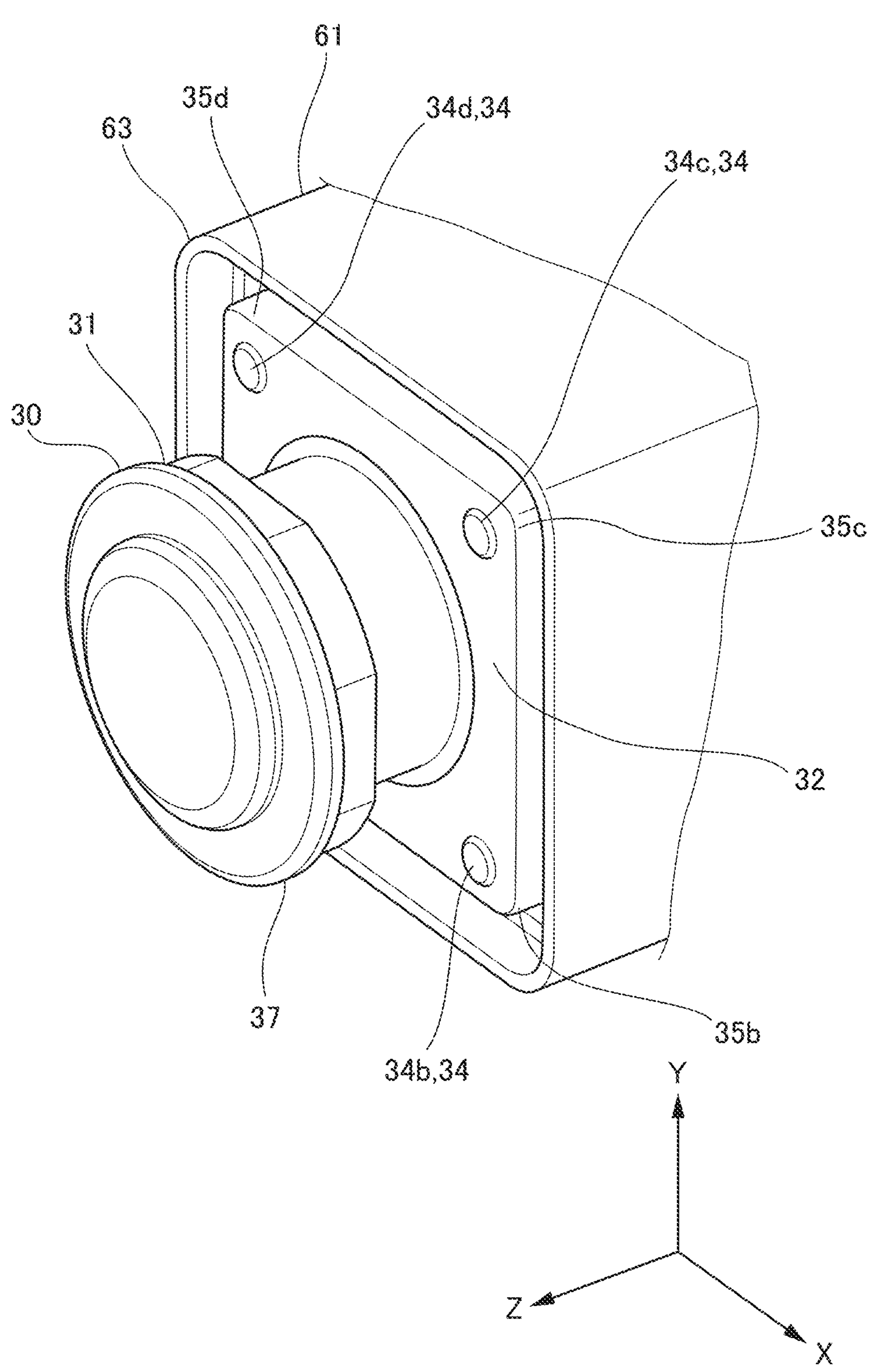
FIG. 13 is a partial perspective view of a vehicular camera according to a second embodiment.
Figure 14:
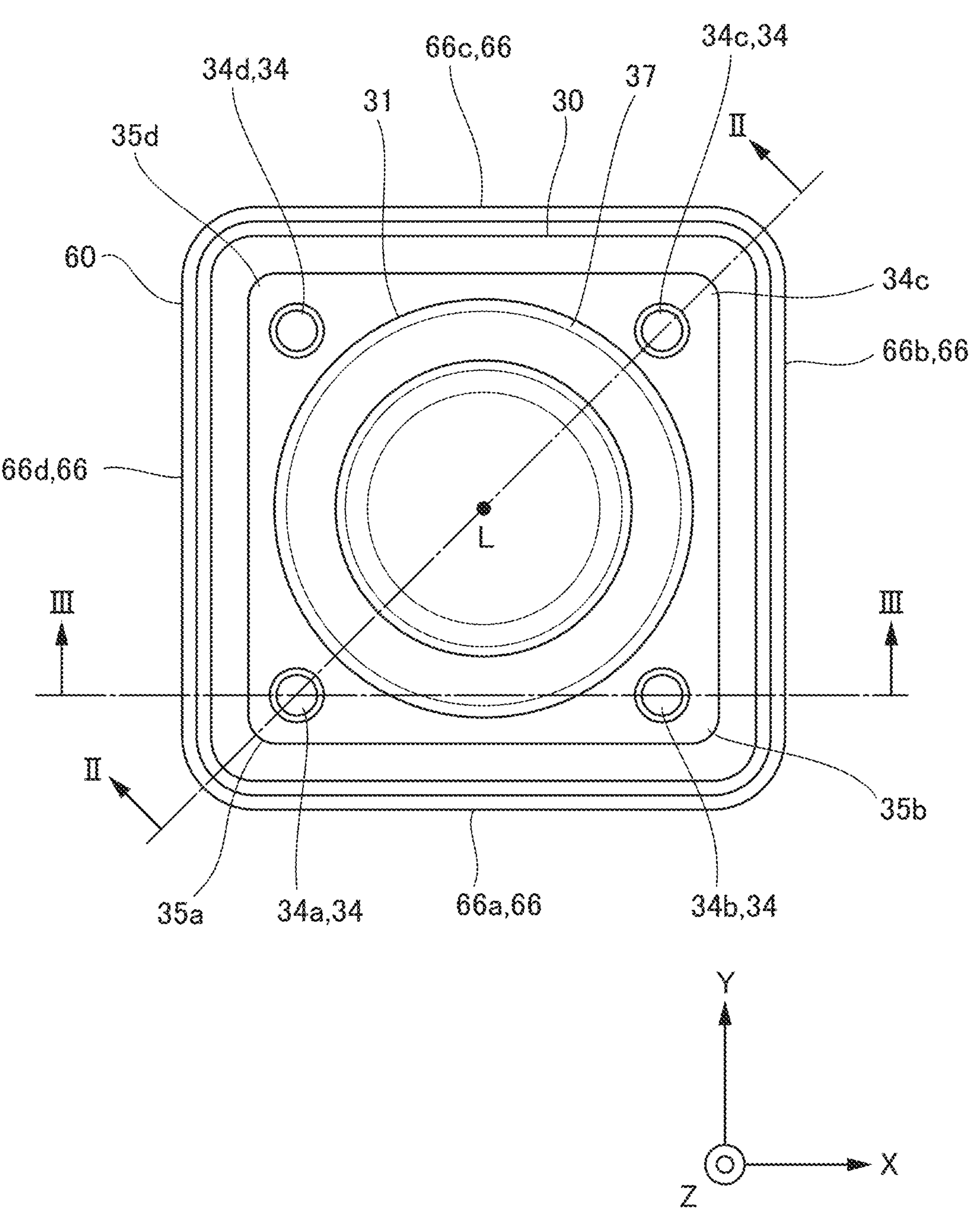
FIG. 14 is a top view of the vehicular camera according to the second embodiment.
Figure 15:
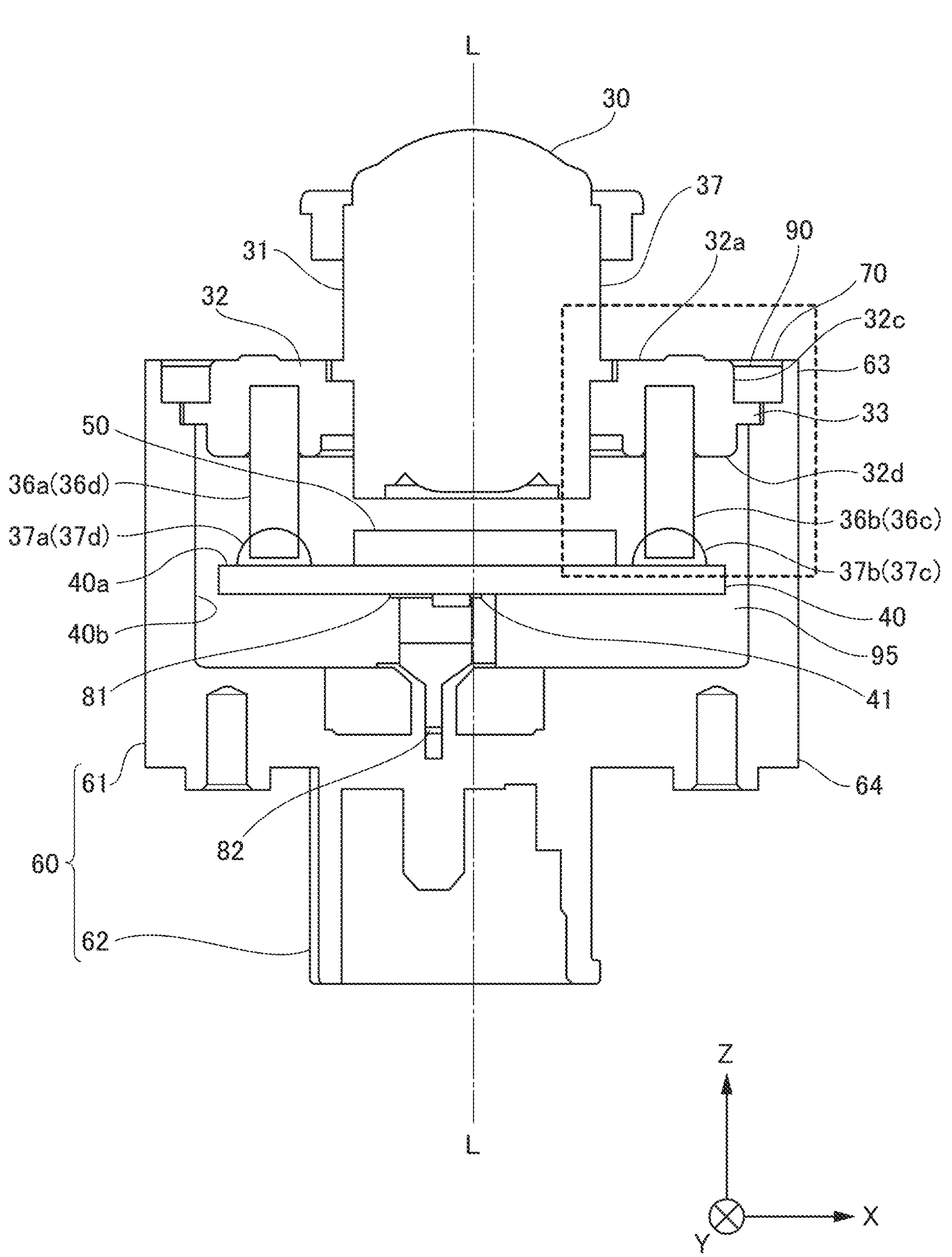
FIG. 15 is a cross-sectional view taken along a line II-II in FIG. 14.
Figure 16:
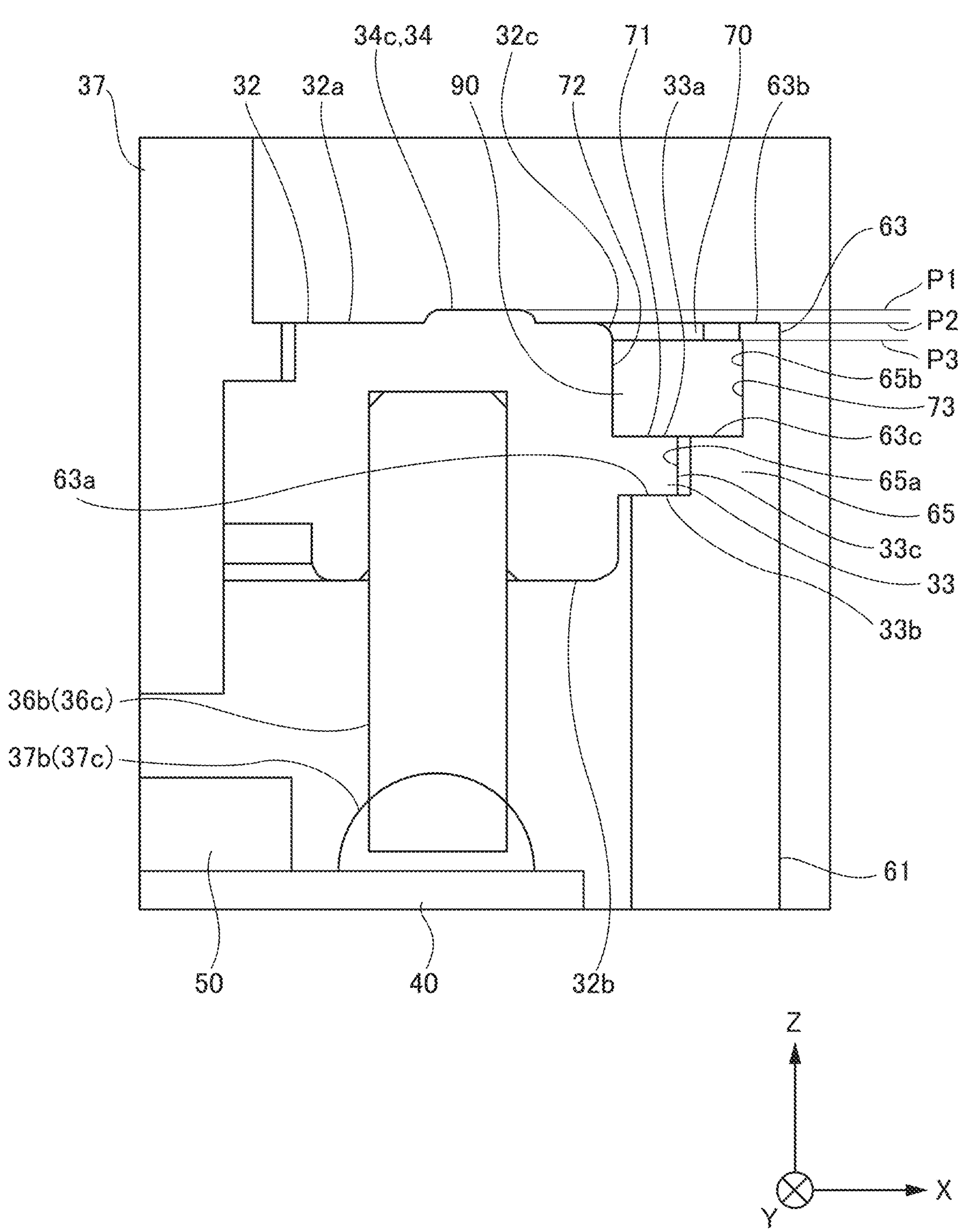
FIG. 16 is an enlarged view of a portion within a frame in FIG. 15.
Figure 17:
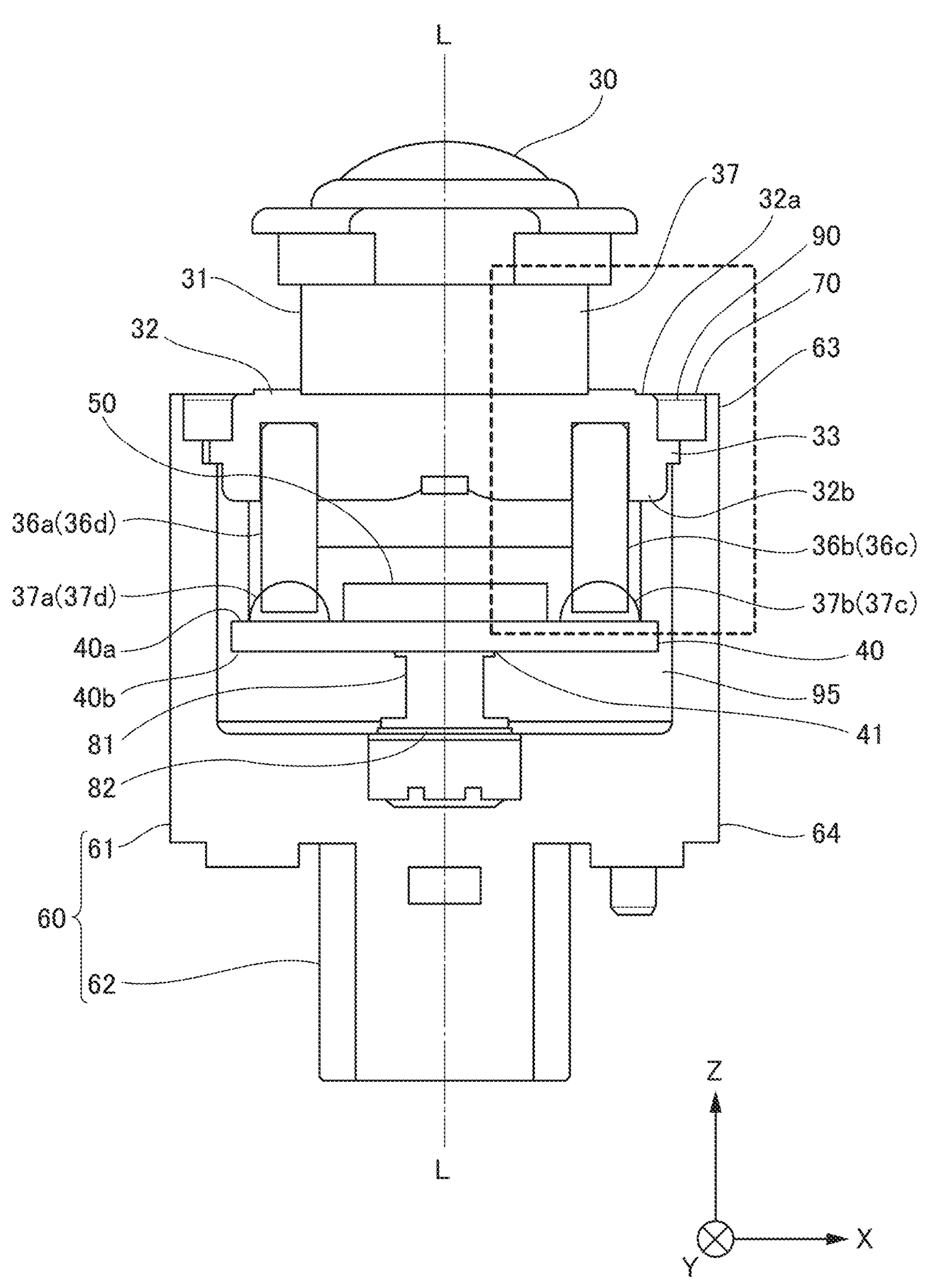
FIG. 17 is a cross-sectional view taken along a line III-III in FIG. 14.
Figure 18:
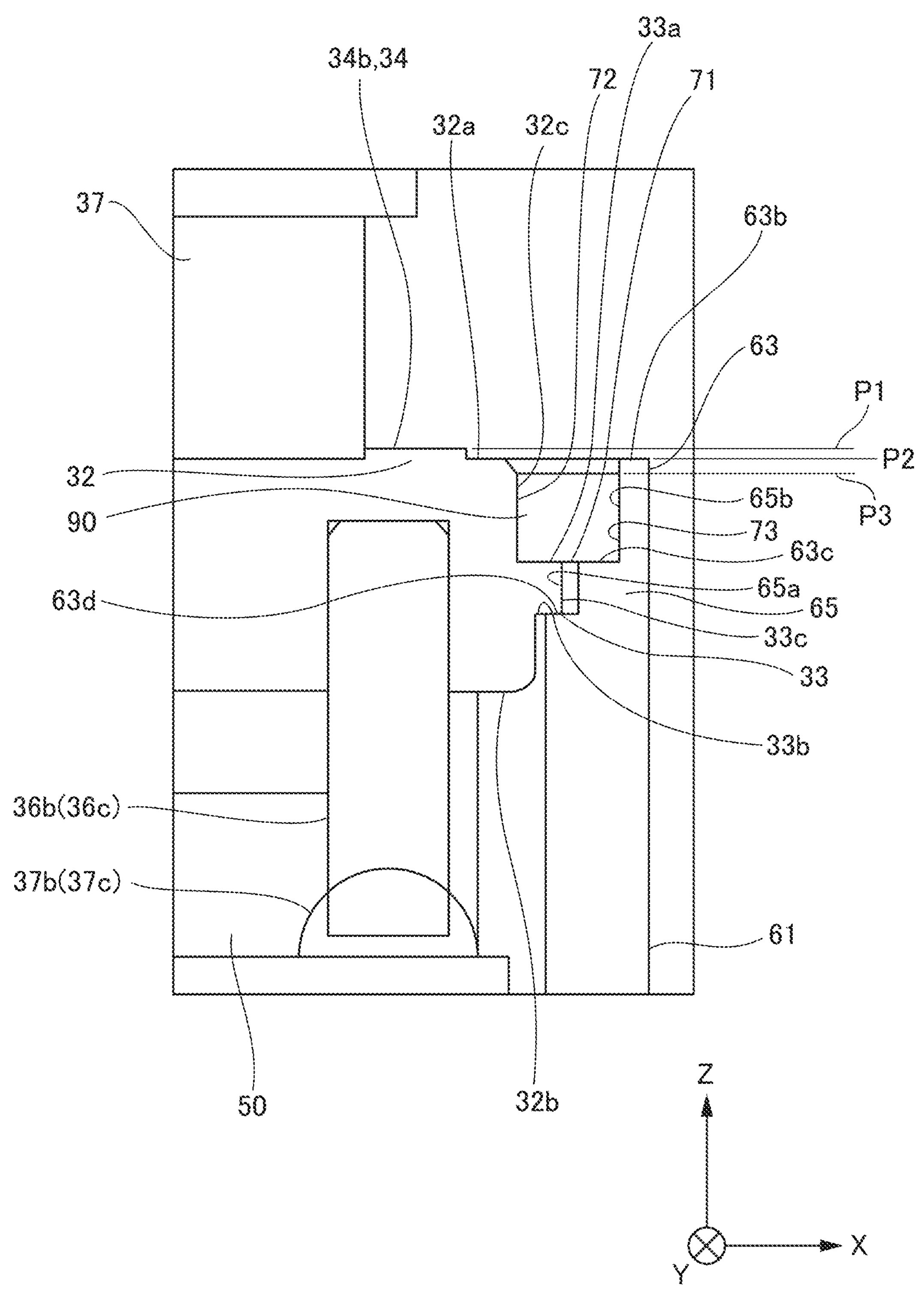
FIG. 18 is an enlarged view of a portion within a frame in FIG. 17.

FIG. 13 is a partial perspective view of a vehicular camera 100 according to a second embodiment. FIG. 14 is a top view of the vehicular camera 100 according to the second embodiment. FIG. 15 is a cross-sectional view taken along a line II-II in FIG. 14. FIG. 16 is an enlarged view of a portion within a frame in FIG. 15. FIG. 17 is a cross-sectional view taken along a line III-III in FIG. 14. FIG. 18 is an enlarged view of a portion within a frame in FIG. 17.

The configuration of the vehicular camera 100 according to the second embodiment is basically the same as the configuration of the vehicular camera 100 according to the first embodiment, but the shape of the flange portion 32 of the lens unit 30 and the shape of the first end 63 of the housing 60 are different from those in the first embodiment. First, the shape of the first end 63 will be described.

In the first embodiment, the first portion 65*a* and the second portion 65*b* of the inner side surface of the housing protruding portion 65 exist on the same surface parallel to the optical axis L. On the other hand, in the present embodiment, the first portion 65*a* of the inner side surface of the housing protruding portion 65 is located closer to the optical axis L than the second portion 65*b* (the second side surface 73 of the groove portion 70) of the inner side surface of the housing protruding portion 65 in a direction along the first surface 40*a* of the circuit board 40 (see FIG. 16). Further, the housing 60 has a third housing end surface 63*c* connecting the first portion 65*a* and the second portion 65*b*. The third housing end surface 63*c* may be along the first surface 40*a* of the circuit board 40. Accordingly, the first end 63 has a stepped shape including the first housing end surface 63*a*, the first portion 65*a*, the third housing end surface 63*c*, the second portion 65*b*, and the second housing end surface 63*b*.

The above configuration can also be described as follows. The second housing end surface 63*b* of the housing protruding portion 65 is a surface intersecting the second portion 65*b* of the inner side surface of the housing protruding portion 65. The second portion 65*b* is a surface intersecting the third housing end surface 63*c*. The third housing end surface 63*c* is a surface intersecting the first portion 65*a* of the inner side surface of the housing protruding portion 65. The first portion 65*a* is a surface intersecting the first housing end surface 63*a*.

Thus, the bottom surface 71 of the groove portion 70 includes a part of the first flange protruding surface 33*a* of the flange protruding portion 33 of the flange portion 32 and also includes the third housing end surface 63*c*.

That is, the bottom surface 71 of the groove portion 70 has a part of the first flange protruding surface 33*a* and the third housing end surface 63*c* connecting the first portion 65*a* and the second portion 65*b* of the inner side surface of the housing protruding portion 65. Thus, since the resin member 90 covers both the first flange protruding surface 33*a* on the flange portion 32 side and the third housing end surface 63*c* on the housing 60 side at the bottom surface 71 of the groove portion 70, it is possible to appropriately prevent the intrusion of foreign matters from the outside.

Similarly to the first embodiment, the second portion 65*b* is disposed along the optical axis L. Accordingly, the resin member 90 can stably cover the second portion 65*b* and a part of the second side surface 73 of the groove portion 70. However, the second portion 65*b* may be inclined with respect to the optical axis L.

Next, the shape of the flange portion 32 will be described. In the first embodiment, the first flange surface 32*a* of the flange portion 32 is formed in a planar shape perpendicular to the optical axis L. On the other hand, in the present embodiment, a part of the first flange surface 32*a* is separated from (in other words, protrudes from) the second housing end surface 63*b* of the housing protruding portion 65 of the first end 63 of the housing 60 in the direction of the optical axis L with reference to the second end 64 of the housing 60. Specifically, as shown in FIGS. 16 and 18, a part of the first flange surface 32*a* is a cylindrical convex portion 34 protruding from the first flange surface 32*a*. In the direction of the optical axis L, a position P1 of a top surface of the convex portion 34 is separated from a position P2 of the second housing end surface 63*b* with reference to the second end 64 of the housing 60. However, the protruding portion of the first flange surface 32*a* is not limited to a circular convex portion.

A part of the first flange surface protruding in this manner can be used for positioning with respect to the vehicle body of the vehicle V.

In addition, the second housing end surface 63*b* of the housing protruding portion 65 is separated from an exposed surface of the resin member 90 with reference to the second end 64 of the housing 60 in the direction along the optical axis L. Specifically, as shown in FIGS. 16 and 18, the position P2 of the second housing end surface 63*b* is separated from a position P3 of the exposed surface of the resin member 90 with reference to the second end 64 of the housing 60 in the direction of the optical axis L.

Accordingly, while a part of the first flange surface 32*a* can be used for positioning with respect to the vehicle body of the vehicle V, it is possible to prevent the resin member 90 from protruding and deteriorating the appearance quality.

However, the exposed surface of the resin member 90 may be separated from the second housing end surface 63*b* of the first end 63 of the housing 60 with reference to the second end 64 of the housing 60 in the direction along the optical axis L. In this case, in FIGS. 16 and 18, the position P3 of the exposed surface of the resin member 90 is closer to the position P1 of the top surface of the convex portion 34 than the position P2 of the second housing end surface 63*b*. Even with such a configuration, there is no problem in practical use.

As described above, the flange portion 32 has at least three convex portions 34, in the present embodiment, four convex portions 34 on the first flange surface 32*a* (see FIG. 14). Specifically, the three convex portions 34 include a first convex portion 34*a*, a second convex portion 34*b*, and a third convex portion 34*c*, and the first convex portion 34*a*, the second convex portion 34*b*, and the third convex portion 34*c* are disposed around the first tubular portion 37 of the lens unit 30. In the present embodiment, a fourth convex portion 34*d* is also disposed around the first tubular portion 37 (see FIG. 14).

Accordingly, the three convex portions 34 of the first flange surface 32*a* can be used for positioning with respect to the vehicle body of the vehicle V, and the positioning can be stably performed. Of course, four convex portions 34 may be provided as in the embodiment.

The flange portion 32 of the lens unit 30 has a first rectangle in a plan view (a plan view when viewed from the direction of the optical axis L, the same applies below) of the flange portion 32, and the first rectangle has at least a first corner 35*a*, a second corner 35*b*, a third corner 35*c*, and a fourth corner 35*d*. The first convex portion 34*a* is located at a position corresponding to the first corner 35*a*, the second convex portion 34*b* is located at a position corresponding to the second corner 35*b*, and the third convex portion 34*c* is located at a position corresponding to the third corner 35*c*.

Accordingly, in the flange portion 32, the three convex portions 34 are formed at positions corresponding to the three corners, and the positioning with respect to the vehicle body of the vehicle V can be more stably performed.

Third Embodiment

Figure 19:
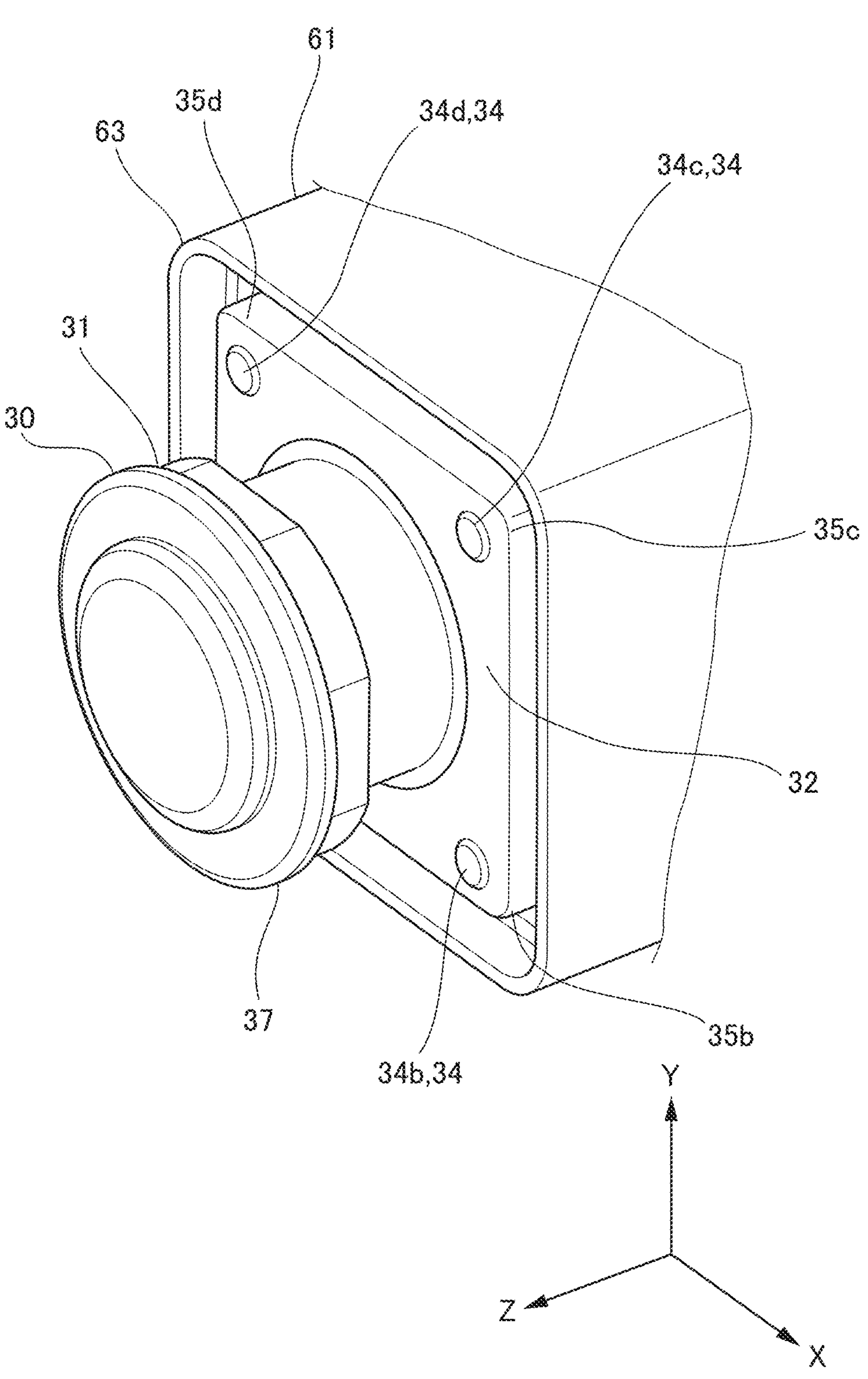
FIG. 19 is a partial perspective view of a vehicular camera according to a third embodiment.
Figure 20:
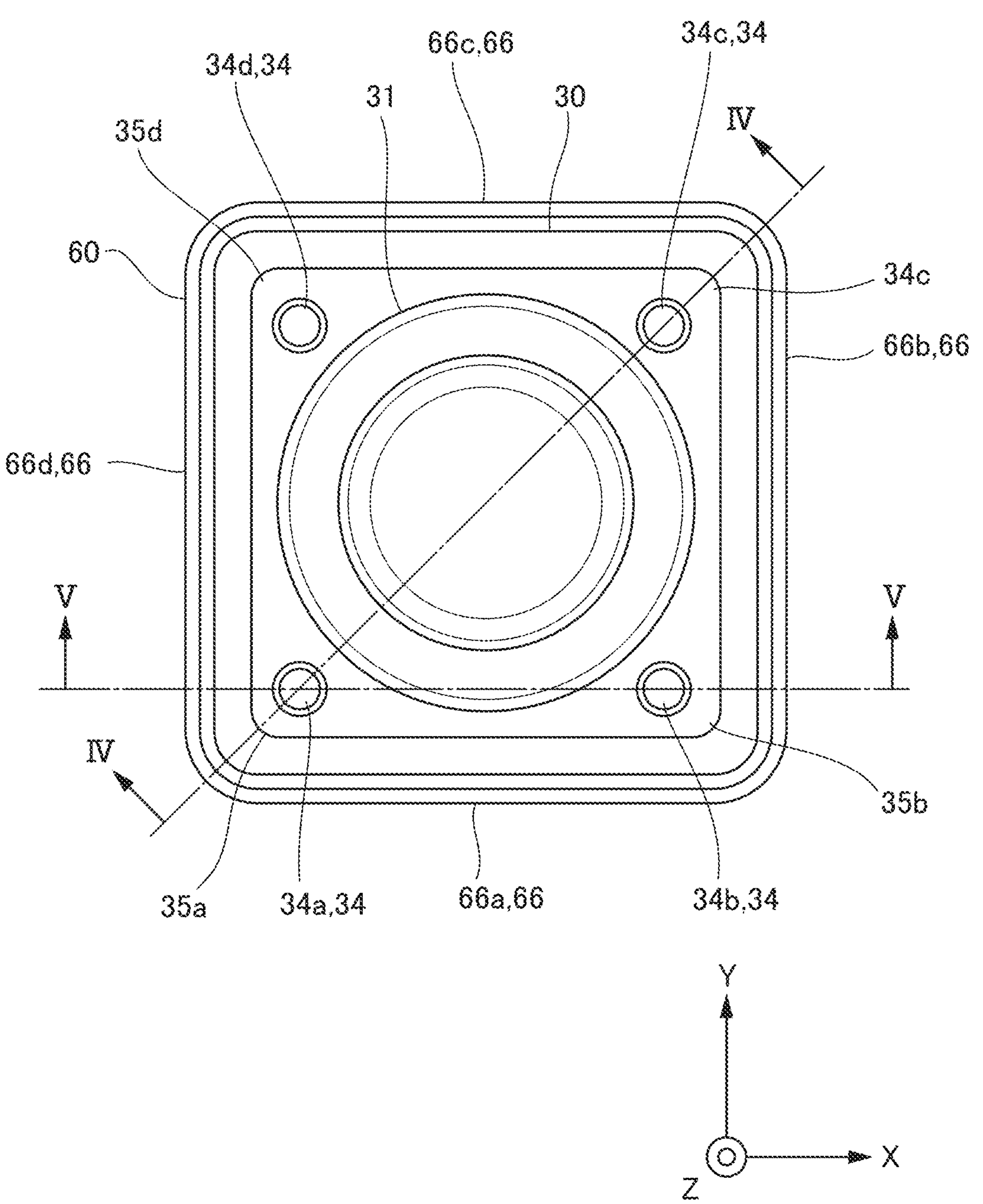
FIG. 20 is a top view of the vehicular camera according to the third embodiment.
Figure 21:
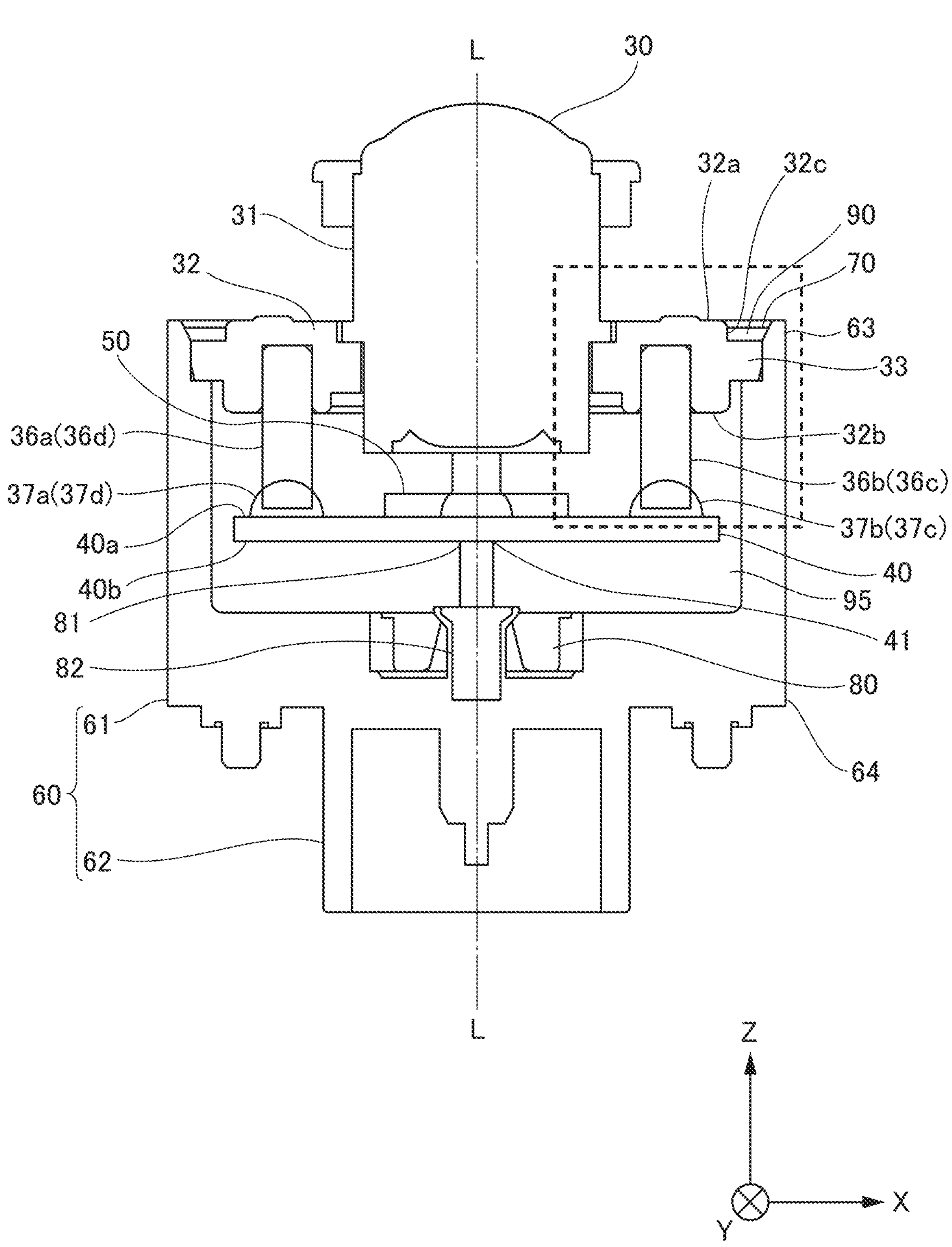
FIG. 21 is a cross-sectional view taken along a line IV-IV in FIG. 20.
Figure 22:
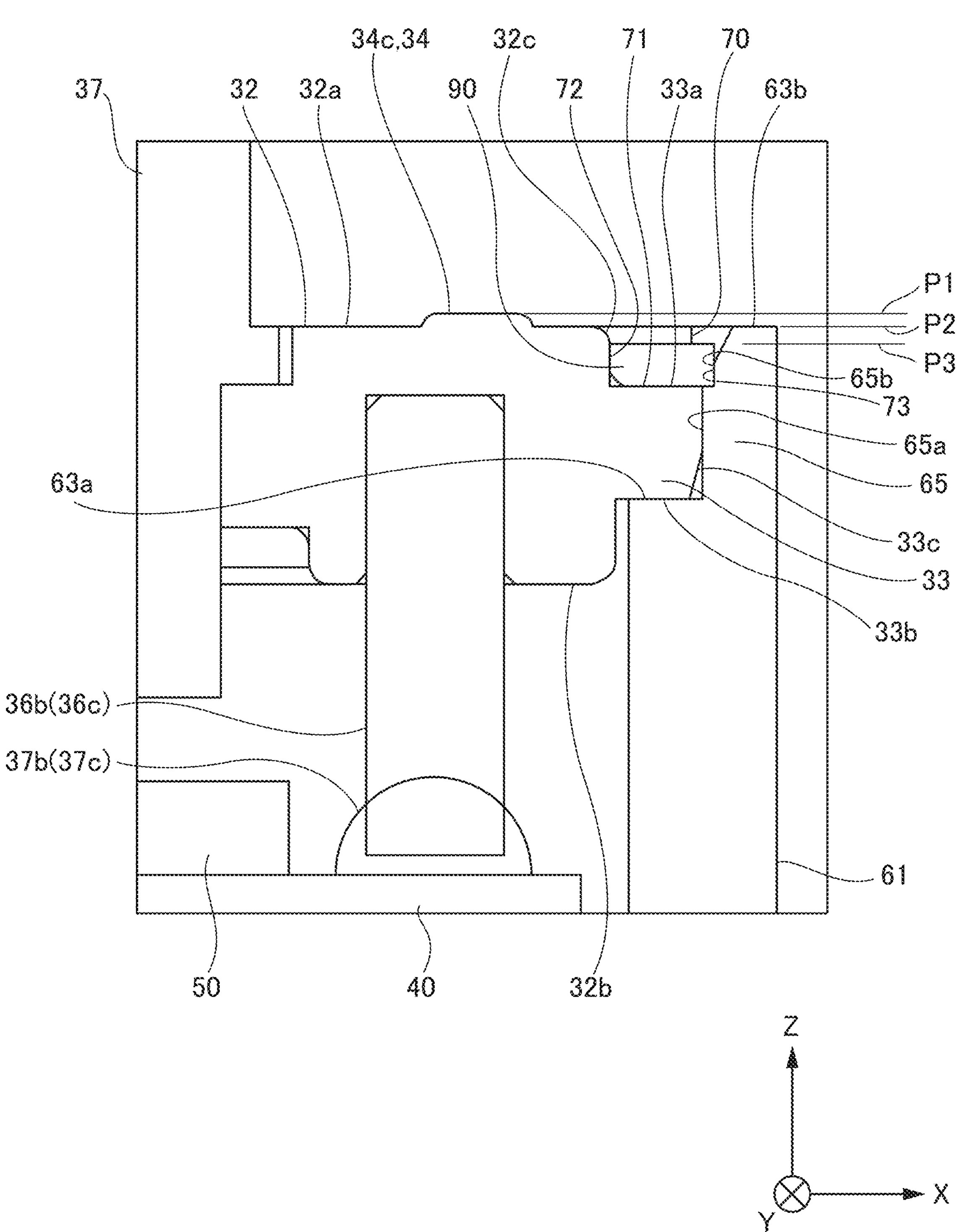
FIG. 22 is an enlarged view of a portion within a frame in FIG. 21.
Figure 23:
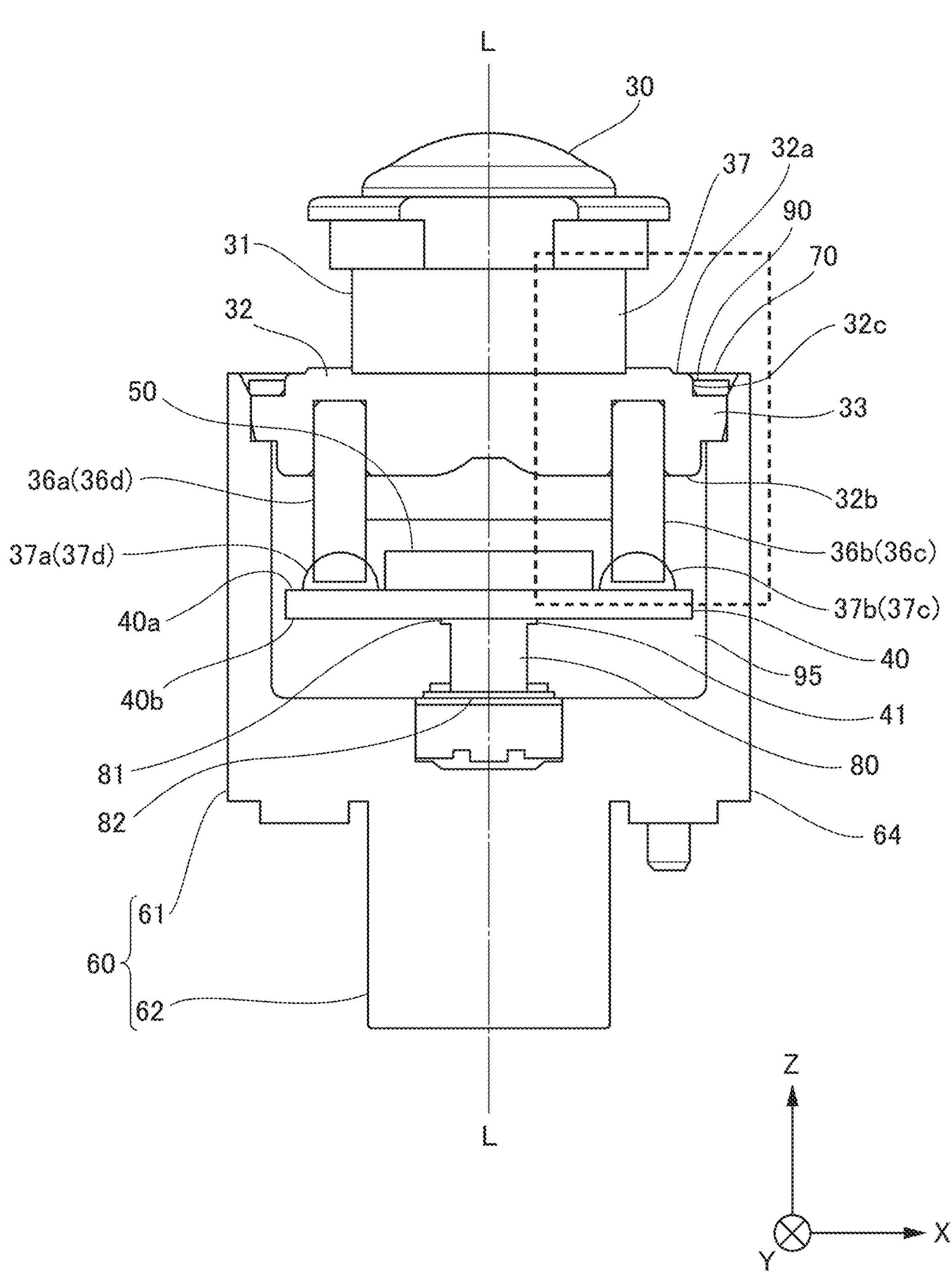
FIG. 23 is a cross-sectional view taken along a line IV-IV in FIG. 20.
Figure 24:
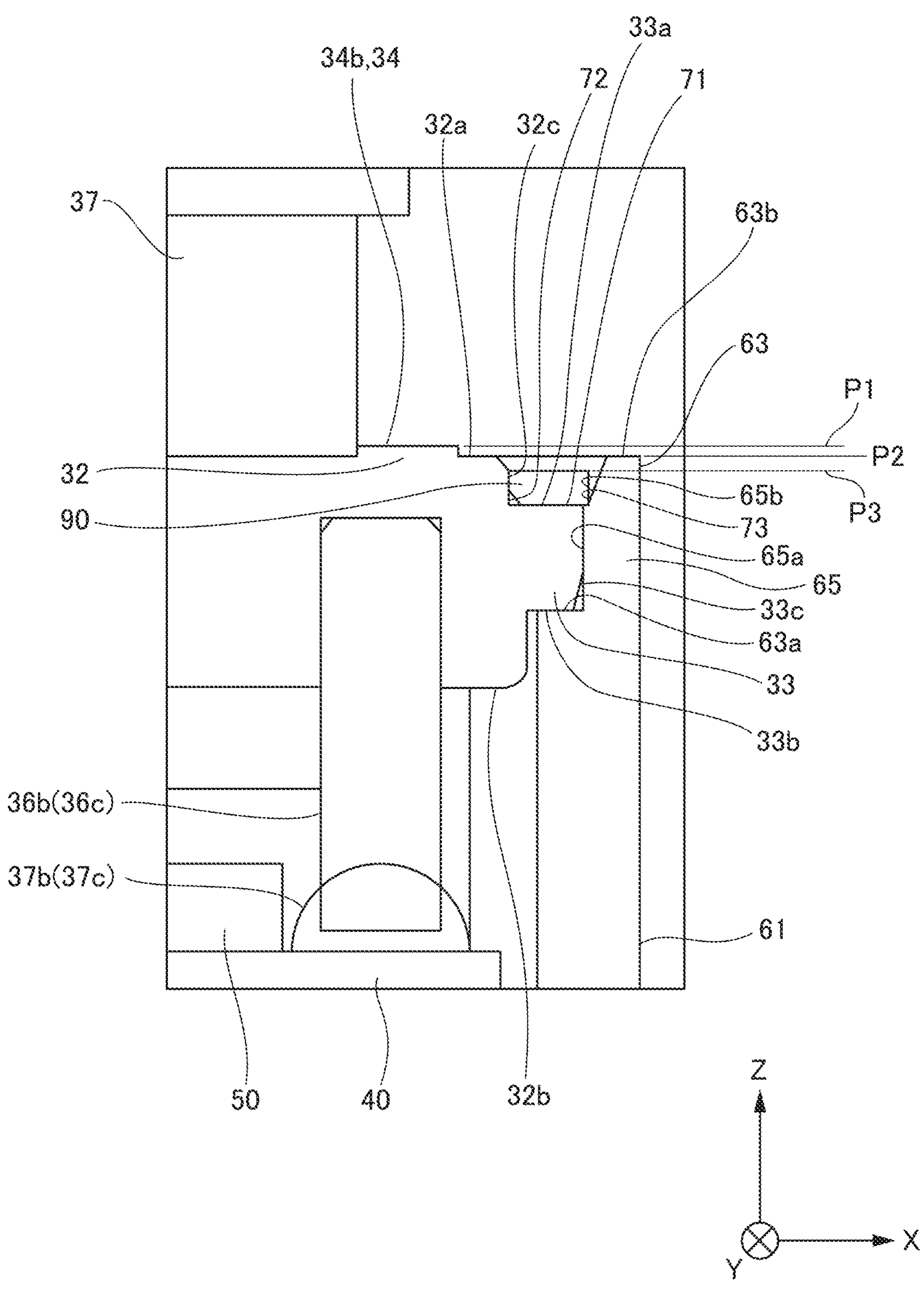
FIG. 24 is an enlarged view of a portion within a frame in FIG. 23.

FIG. 19 is a partial perspective view of a vehicular camera 100 according to a third embodiment. FIG. 20 is a top view of the vehicular camera 100 according to the third embodiment. FIG. 21 is a cross-sectional view taken along a line IV-IV in FIG. 20. FIG. 22 is an enlarged view of a portion within a frame in FIG. 21. FIG. 23 is a cross-sectional view taken along a line IV-IV in FIG. 20. FIG. 24 is an enlarged view of a portion within a frame in FIG. 23.

The configuration of the vehicular camera 100 according to the third embodiment is basically the same as the configuration of the vehicular camera 100 according to the first embodiment and the second embodiment. In the present embodiment, the second portion 65*b* of the inner side surface of the housing protruding portion 65 has a tapered shape that expands gradually away from the optical axis L from the first portion 65*a* toward the second housing end surface 63*b*. In the direction along the optical axis L, the second portion 65*b* is located between the first portion 65*a* of the inner side surface of the housing protruding portion 65 and the second housing end surface 63*b* of the housing 60.

The above configuration can also be described as follows. The second housing end surface 63*b* of the housing protruding portion 65 is a surface intersecting the second portion 65*b* of the inner side surface of the housing protruding portion 65. The second portion 65*b* is a surface intersecting the first portion 65*a*. The first portion 65*a* is a surface intersecting the first housing end surface 63*a*.

Accordingly, when the vehicular camera 100 is manufactured, the lens unit 30 can be easily disposed in the housing 60, and when a raw material of the resin member 90 such as potting resin is poured, the resin member 90 can be easily prevented from overflowing from the groove portion 70.

The following description is common to all the embodiments.

The first tubular portion 37 of the lens unit 30 and the metal flange portion 32 may be configured separately, and the lens unit 30 may be configured by coupling the first tubular portion 37 and the flange portion 32 at least. Accordingly, separately from the metal flange portion 32, an appropriate first tubular portion 37 can be manufactured as necessary. In this case, the first tubular portion 37 and the flange portion 32 may be joined by an adhesive. The first tubular portion 37 may be a resin member.

Alternatively, the first tubular portion 37 of the lens unit 30 may be made of metal, and the first tubular portion 37 and the metal flange portion 32 may be integrally formed. Accordingly, the metal flange portion 32 and the first tubular portion 37 can be integrally manufactured, and a manufacturing process can be simplified.

As shown in FIGS. 9, 15, and 21, the flange portion 32 of the lens unit 30 includes at least a first protrusion 36*a*, a second protrusion 36*b*, and a third protrusion 36*c* protruding from the second flange surface 32*b* of the flange portion 32 toward the first surface 40*a* of the circuit board 40. The third protrusion 36*c* is present on a rear side of the second protrusion 36*b* in the Y-axis direction.

The first protrusion 36*a* and the first surface 40*a* of the circuit board 40 are bonded with a first adhesive 37*a*, the second protrusion 36*b* and the first surface 40*a* of the circuit board 40 are bonded with a second adhesive 37*b*, and the third protrusion 36*c* and the first surface 40*a* of the circuit board 40 are bonded with a third adhesive 37*c*. The third adhesive 37*c* is present on a rear side of the second adhesive 37*b* in the Y-axis direction.

Accordingly, since the flange portion 32 is supported not only by the housing 60 but also by the circuit board 40 via at least three protrusions, the lens unit 30 can be more stably disposed. In the present embodiment, a fourth protrusion 36*d* and a fourth adhesive 37*d* are present on rear sides of the first protrusion 36*a* and the first adhesive 37*a* in the Y-axis direction, respectively, and the flange portion 32 is supported by the circuit board 40 via the four protrusions.

The number of pixels of the imaging element 50 is, for example, 3 megabytes or more and 15 megabytes or less, specifically, 3 megabytes, 5 megabytes, 8 megabytes, or the like. The housing 60 includes four side walls 66 that are formed continuously with the second end 64 of the housing 60 and extend from the second end 64 toward the second flange surface 32*b* of the lens unit 30. The four side walls 66 are a first side wall 66*a*, a second side wall 66*b*, a third side wall 66*c*, and a fourth side wall 66*d*. The first side wall 66*a* is connected to the second side wall 66*b*, the second side wall 66*b* is connected to the third side wall 66*c*, the third side wall 66*c* is connected to the fourth side wall 66*d*, and the fourth side wall 66*d* is connected to the first side wall 66*a*. The vehicular camera 100 includes a heat-conducting member 95 that is located inside the second tubular portion (the large-diameter tubular portion 61) of the housing 60 and is disposed between the second surface 40*b* of the circuit board 40 and the second end 64 of the housing 60.

Accordingly, the heat from the imaging element 50, which is likely to generate heat at high pixels, can be efficiently dissipated to the housing 60 through the heat-conducting member 95. The heat-conducting member 95 may be made of, for example, silicone resin. The heat-conducting member 95 shown in the exploded perspective view of FIG. 7 shows a shape before manufacturing the vehicular camera 100, and the heat-conducting member 95 is disposed between the second surface 40*b* of the circuit board 40 and the second end 64 of the housing 60 after manufacturing by applying heat during manufacturing.

The vehicular camera 100 further includes the electrical connector 80 including a first connector end 81 and a second connector end 82 opposite to the first connector end 81, and a connector connection portion 41 disposed on the second surface 40*b* of the circuit board 40. The electrical connector 80 is disposed inside the large-diameter tubular portion 61 of the housing 60.

The first connector end 81 of the electrical connector 80 is electrically connected to the connector connection portion 41 on the second surface 40*b* of the circuit board 40, and the second connector end 82 of the electrical connector 80 is electrically connected to a cable of the vehicle V when the vehicular camera 100 is disposed in the vehicle V.

Accordingly, the circuit board 40 and the cable of the vehicle V can be electrically connected with a simple configuration using the electrical connector 80.

The first tubular portion 37 of the lens unit 30 has a circular shape in a plan view of the first tubular portion 37. The flange portion 32 of the lens unit 30 has a first rectangle in a plan view of the flange portion 32. The flange protruding portion 33 of the lens unit 30 has a second rectangle having a larger area than the first rectangle of the flange portion 32 in a plan view of the flange protruding portion 33. The large-diameter tubular portion 61 of the housing 60 has a third rectangle having a larger area than the first rectangle of the flange portion 32 in a plan view of the large-diameter tubular portion 61.

Accordingly, it is possible to manufacture the lens unit 30 and the housing 60 in a simple shape.

Note that the lens unit 30 can be understood as a first housing including a tubular lens barrel 31 having at least one lens 38. In addition, the housing 60 can be understood as a second housing that accommodates at least the circuit board 40 and the imaging element 50. Thus, the vehicular camera 100 according to the embodiment includes the welded portion 20 at which a part of the first housing and a part of the second housing are welded, and the welded portion 20 is covered with a resin constituted with the resin member 90. Since the resin covers the welded portion 20 between the first housing having the lens barrel 31 and the second housing accommodating the circuit board 40 and the imaging element 50, excellent environmental resistance and appearance quality can be ensured.

From the above, at least the following matters are described in the present disclosure. Components corresponding to those in the embodiment are shown in parentheses, but the present disclosure is not limited thereto.

(1) A vehicular camera (vehicular camera 100) including:

a lens unit (lens unit 30) including a first tubular portion (first tubular portion 37) having a first tubular shape, at least one lens (lens 38) disposed inside the first tubular portion and on an optical axis (optical axis L), and a metal flange portion (flange portion 32) disposed outside the first tubular portion to extend outward with reference to the optical axis over an entire circumference centering on the optical axis;

a circuit board (circuit board 40) including a first surface (first surface 40*a*) and a second surface (second surface 40*b*) opposite to the first surface;

an imaging element (imaging element 50) disposed on the optical axis and on the first surface of the circuit board;

a metal housing (housing 60) configured to accommodate at least the circuit board and the imaging element and including a second tubular portion (large-diameter tubular portion 61) having a second tubular shape along the optical axis, in which the second tubular portion of the housing includes a first end (first end 63), and a second end (second end 64) that is opposite to the first end and is disposed at a position farther than the first end with reference to the lens unit in a direction of the optical axis, the flange portion of the lens unit includes a first flange surface (first flange surface 32*a*) disposed along the first surface of the circuit board, a second flange surface (second flange surface 32*b*) disposed along the first surface of the circuit board and located closer to the first surface of the circuit board than the first flange surface with reference to the first surface of the circuit board in the direction of the optical axis, a flange end surface (flange end surface 32*c*) configured to connect the first flange surface and the second flange surface, and a flange protruding portion (flange protruding portion 33) disposed to extend outward from the flange end surface with reference to the optical axis over the entire circumference centering on the optical axis, the flange protruding portion of the flange portion of the lens unit includes a first flange protruding surface (first flange protruding surface 33*a*) disposed along the first surface of the circuit board, a second flange protruding surface (second flange protruding surface 33*b*) disposed along the first surface of the circuit board and located closer to the first surface of the circuit board than the first flange protruding surface with reference to the first surface of the circuit board in the direction of the optical axis, and a flange protruding end surface (flange protruding end surface 33*c*) configured to connect the first flange protruding surface and the second flange protruding surface, the first end of the housing includes a first housing end surface (first housing end surface 63*a*) disposed along the first surface of the circuit board, and a housing protruding portion (housing protruding portion 65) protruding in a direction away from the first housing end surface with reference to the second end of the housing, the housing protruding portion has a second housing end surface (second housing end surface 63*b*) at a top portion, the flange protruding end surface of the flange protruding portion of the flange portion faces a first portion (first portion 65*a*) of an inner side surface of the housing protruding portion of the housing, the second flange protruding surface of the flange protruding portion of the flange portion faces the first housing end surface of the housing, the vehicular camera includes a groove portion (groove portion 70) that is disposed between the flange portion and the housing protruding portion of the first end of the housing over the entire circumference centering on the optical axis and includes a bottom surface (bottom surface 71), a first side surface (first side surface 72), and a second side surface (second side surface 73), the bottom surface of the groove portion has at least a part of the first flange protruding surface of the flange protruding portion of the flange portion, the first side surface of the groove portion has at least a part of the flange end surface of the flange portion, the second side surface of the groove portion has at least a second portion (second portion 65*b*) of the inner side surface of the housing protruding portion of the first end of the housing, the second portion being farther from the first portion with reference to the second end of the housing, the flange protruding end surface of the flange protruding portion of the flange portion is welded to the first portion of the inner side surface of the housing protruding portion of the first end of the housing, and/or the second flange protruding surface of the flange protruding portion of the flange portion is welded to the first housing end surface of the first end of the housing, and the vehicular camera includes a resin member (resin member 90) configured to cover at least the bottom surface of the groove portion, a part of the first side surface of the groove portion, and a part of the second side surface of the groove portion over the entire circumference centering on the optical axis.

Performance such as heat dissipation and noise resistance is improved by adopting the lens unit including the metal flange portion and the metal housing in the vehicular camera of the present disclosure. However, these metal members may cause problems of environmental resistance including corrosion and the like at the welded portion and appearance quality. However, in the vehicular camera of the present disclosure, since the resin member covers at least a part of the groove portion formed between the flange portion and the housing protruding portion of the housing over the entire circumference, excellent environmental resistance and appearance quality can be ensured.

(2) The vehicular camera according to (1), in which the first portion of the inner side surface of the housing protruding portion of the first end of the housing is located closer to the optical axis than the second portion of the inner side surface of the housing protruding portion of the first end of the housing in a direction along the first surface of the circuit board, the housing includes a third housing end surface (third housing end surface 63*c*) configured to connect the first portion of the inner side surface of the housing protruding portion and the second portion of the inner side surface of the housing protruding portion, and the bottom surface of the groove portion includes a part of the first flange protruding surface of the flange protruding portion of the flange portion, and includes the third housing end surface of the first end of the housing.

Accordingly, since the bottom surface of the groove portion includes a part of the first flange protruding surface of the flange protruding portion of the flange portion and the third housing end surface connecting the first portion and the second portion of the inner side surface of the housing protruding portion, the resin member can stably cover at least a part of the groove portion.

(3) The vehicular camera according to (1), in which the second portion of the inner side surface of the housing protruding portion of the first end of the housing is disposed along the optical axis.

Accordingly, since the resin member covers both the first flange protruding surface on the flange portion side and the third housing end surface on the housing side at the bottom surface of the groove portion, it is possible to prevent the intrusion of foreign matters from the outside at a high level.

(4) The vehicular camera according to (1), in which the second portion of the inner side surface of the housing protruding portion of the first end of the housing has a tapered shape expanding away from the optical axis from the first portion of the inner side surface of the housing protruding portion toward the second housing end surface of the housing protruding portion.

Accordingly, when the vehicular camera is manufactured, the lens unit can be easily disposed in the housing, and when a raw material of the resin member is poured, the resin member can be easily prevented from overflowing from the groove.

(5) The vehicular camera according to (1), in which the flange protruding end surface of the flange protruding portion of the flange portion of the lens unit is welded to the first portion of the inner side surface of the housing protruding portion of the first end of the housing by a laser, and/or the second flange protruding surface of the flange protruding portion of the flange portion is welded to the first housing end surface of the first end of the housing by a laser.

Accordingly, the flange protruding end surface and/or the second flange protruding surface of the flange protruding portion of the flange portion can be firmly welded to the housing.

(6) The vehicular camera according to (1), in which a part of the first flange surface of the flange portion of the lens unit is separated from the second housing end surface of the housing protruding portion of the first end of the housing with reference to the second end of the housing in the direction of the optical axis.

Accordingly, a part of the first flange surface can be used for positioning with respect to a vehicle body of a vehicle.

(7) The vehicular camera according to (6), in which the second housing end surface of the housing protruding portion of the first end of the housing is separated from an exposed surface of the resin member with reference to the second end of the housing in a direction along the optical axis.

Accordingly, while a part of the first flange surface can be used for positioning with respect to the vehicle body of the vehicle, it is possible to prevent the resin member from protruding and deteriorating the appearance quality.

(8) The vehicular camera according to (1), in which the flange portion of the lens unit includes at least three convex portions (convex portions 34) on the first flange surface, the at least three convex portions of the flange portion include a first convex portion (first convex portion 34*a*), a second convex portion (second convex portion 34*b*), and a third convex portion (third convex portion 34*c*), and the first convex portion, the second convex portion, and the third convex portion are disposed around the first tubular portion of the lens unit.

Accordingly, the three convex portions of the first flange surface can be used for positioning with respect to the vehicle body of the vehicle, and the positioning can be stably performed.

(9) The vehicular camera according to (8), in which the flange portion of the lens unit has a first rectangle in a plan view of the flange portion, the first rectangle of the flange portion has at least a first corner (first corner 35*a*), a second corner (second corner 35*b*), a third corner (third corner 35*c*), and a fourth corner (fourth corner 35*d*), the first convex portion of the flange portion is located at a position corresponding to the first corner of the flange portion, the second convex portion of the flange portion is located at a position corresponding to the second corner of the flange portion, and the third convex portion of the flange portion is located at a position corresponding to the third corner of the flange portion.

Accordingly, in the flange portion, three convex portions are formed at positions corresponding to three corners, and the positioning with respect to the vehicle body of the vehicle can be more stably performed.

(10) The vehicular camera according to (1), in which the first tubular portion of the lens unit and the flange portion of the lens unit are separate, and the lens unit is configured by coupling the first tubular portion and the flange portion at least.

Accordingly, separately from the metal flange portion, an appropriate first tubular portion can be manufactured as necessary.

(11) The vehicular camera according to (1), in which the first tubular portion of the lens unit is made of metal, and the first tubular portion of the lens unit and the flange portion are integrally formed.

Accordingly, the metal flange portion and the first tubular portion can be integrally manufactured, and a manufacturing process can be simplified.

(12) The vehicular camera according to (1), in which the flange portion of the lens unit includes at least a first protrusion (first protrusion 36*a*), a second protrusion (second protrusion 36*b*), and a third protrusion (third protrusion 36*c*) protruding from the second flange surface of the flange portion toward the first surface of the circuit board, the first protrusion of the flange portion and the first surface of the circuit board are bonded with a first adhesive (first adhesive 37*a*), the second protrusion of the flange portion and the first surface of the circuit board are bonded with a second adhesive (second adhesive 37*b*), and the third protrusion of the flange portion and the first surface of the circuit board are bonded with a third adhesive (third adhesive 37*c*).

Accordingly, since the flange portion is supported not only by the housing but also by the circuit board via at least three protrusions, the lens unit can be more stably disposed.

(13) The vehicular camera according to (1), in which the number of pixels of the imaging element is 3 mega or more and 15 mega or less, the housing includes four side walls (side wall 66) that are formed continuously with the second end of the housing and extend from the second end toward the second flange surface of the lens unit, the four side walls are a first side wall (first side wall 66*a*), a second side wall (second side wall 66*b*), a third side wall (third side wall 66*c*), and a fourth side wall (fourth side wall 66*d*), the first side wall of the housing is connected to the second side wall of the housing, the second side wall of the housing is connected to the third side wall of the housing, the third side wall of the housing is connected to the fourth side wall of the housing, the fourth side wall of the housing is connected to the first side wall of the housing, and the vehicular camera includes a heat-conducting member (heat-conducting member 95) located inside the second tubular portion of the housing and disposed between the second surface of the circuit board and the second end of the housing.

Accordingly, the heat from the imaging element, which is likely to generate heat at high pixels, can be efficiently dissipated to the housing through the heat-conducting member.

(14) The vehicular camera according to (13), further including:

an electrical connector (electrical connector 80) including a first connector end (first connector end 81) and a second connector end (second connector end 82) opposite to the first connector end, and a connector connection portion (connector connection portion 41) disposed on the second surface of the circuit board, in which the electrical connector is disposed inside the second tubular portion of the housing.

the first connector end of the electrical connector is electrically connected to the connector connection portion on the second surface of the circuit board, and the second connector end of the electrical connector is electrically connected to a cable of the vehicle when the vehicular camera is disposed in the vehicle.

Accordingly, the circuit board and the cable of the vehicle can be electrically connected with a simple configuration using the electrical connector.

(15) The vehicular camera according to (14), in which the first tubular portion of the lens unit has a circular shape in a plan view of the first tubular portion, the flange portion of the lens unit has a first rectangle in a plan view of the flange portion, the flange protruding portion of the lens unit has a second rectangle having a larger area than the first rectangle of the flange portion in a plan view of the flange protruding portion, and the second tubular portion of the housing has a third rectangle having a larger area than the first rectangle of the flange portion in a plan view of the second tubular portion.

Accordingly, it is possible to manufacture the lens unit and the housing in a simple shape.

(16) A vehicular camera including:

a first housing (lens unit 30) including a tubular lens barrel (lens barrel 31) having at least one lens (lens 38);

a circuit board (circuit board 40) having a first surface (first surface 40*a*) and a second surface (second surface 40*b*) opposite to the first surface;

an imaging element (imaging element 50) disposed on the first surface of the circuit board and on an optical axis (optical axis L) of the at least one lens;

a second housing (housing 60) configured to accommodate at least the circuit board and the imaging element; and a welded portion (welded portion 20) at which a part of the first housing and a part of the second housing are welded, in which the welded portion is covered with a resin (resin member 90).

In the vehicular camera of the present disclosure, since the resin covers the welded portion between the first housing having the lens barrel and the second housing accommodating the circuit board and the imaging element, excellent environmental resistance and appearance quality can be ensured.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the embodiment described above may be freely combined without departing from the gist of the invention.

INDUSTRIAL APPLICABILITY

The present disclosure is useful as a vehicular camera that ensures excellent environmental resistance and appearance quality.

CROSS-REFERENCE TO RELATED APPLICATIONS

This application is based on and claims priority under 35 USC 119 from Japanese Patent Application No. 2023-180360 filed on Oct. 19, 2023, the entire content of which is incorporated herein by reference.

What is claimed is:

1. A vehicular camera comprising:

a lens unit including a first tubular portion having a first tubular shape, at least one lens disposed inside the first tubular portion and on an optical axis, and a metal flange portion disposed outside the first tubular portion to extend outward with reference to the optical axis over an entire circumference centering on the optical axis;

a circuit board including a first surface and a second surface opposite to the first surface;

an imaging element disposed on the optical axis and on the first surface of the circuit board; and a metal housing configured to accommodate at least the circuit board and the imaging element and including a second tubular portion having a second tubular shape along the optical axis, wherein the second tubular portion of the housing includes a first end, and a second end that is opposite to the first end and is disposed at a position farther than the first end with reference to the lens unit in a direction of the optical axis, the flange portion of the lens unit includes a first flange surface disposed along the first surface of the circuit board, a second flange surface disposed along the first surface of the circuit board and located closer to the first surface of the circuit board than the first flange surface with reference to the first surface of the circuit board in the direction of the optical axis, a flange end surface connecting the first flange surface and the second flange surface, and a flange protruding portion disposed to extend outward from the flange end surface with reference to the optical axis over the entire circumference centering on the optical axis, the flange protruding portion of the flange portion in the lens unit includes a first flange protruding surface disposed along the first surface of the circuit board, a second flange protruding surface disposed along the first surface of the circuit board and located closer to the first surface of the circuit board than the first flange protruding surface with reference to the first surface of the circuit board in the direction of the optical axis, and a flange protruding end surface connecting the first flange protruding surface and the second flange protruding surface, the first end of the housing includes a first housing end surface disposed along the first surface of the circuit board, and a housing protruding portion protruding in a direction away from the first housing end surface with reference to the second end of the housing, the housing protruding portion has a second housing end surface at a top portion, the flange protruding end surface of the flange protruding portion of the flange portion faces a first portion of an inner side surface of the housing protruding portion of the housing, the second flange protruding surface of the flange protruding portion of the flange portion faces the first housing end surface of the housing, the vehicular camera includes a groove portion that is disposed between the flange portion and the housing protruding portion of the first end of the housing over the entire circumference centering on the optical axis and includes a bottom surface, a first side surface, and a second side surface, the bottom surface of the groove portion has at least a part of the first flange protruding surface of the flange protruding portion of the flange portion, the first side surface of the groove portion has at least a part of the flange end surface of the flange portion, the second side surface of the groove portion has at least a second portion of the inner side surface of the housing protruding portion of the first end of the housing, the second portion being farther from the first portion with reference to the second end of the housing, the flange protruding end surface of the flange protruding portion of the flange portion is welded to the first portion of the inner side surface of the housing protruding portion of the first end of the housing, and/or the second flange protruding surface of the flange protruding portion of the flange portion is welded to the first housing end surface of the first end of the housing, and the vehicular camera includes a resin member configured to cover at least the bottom surface of the groove portion, a part of the first side surface of the groove portion, and a part of the second side surface of the groove portion over the entire circumference centering on the optical axis.

2. The vehicular camera according to claim 1, wherein the first portion of the inner side surface of the housing protruding portion of the first end in the housing is located closer to the optical axis than the second portion of the inner side surface of the housing protruding portion of the first end of the housing in a direction along the first surface of the circuit board, the housing includes a third housing end surface connecting the first portion of the inner side surface of the housing protruding portion and the second portion of the inner side surface of the housing protruding portion, and the bottom surface of the groove portion includes a part of the first flange protruding surface of the flange protruding portion of the flange portion, and includes the third housing end surface of the first end of the housing.

3. The vehicular camera according to claim 1, wherein the second portion of the inner side surface of the housing protruding portion of the first end of the housing is disposed along the optical axis.

4. The vehicular camera according to claim 1, wherein the second portion of the inner side surface of the housing protruding portion of the first end of the housing has a tapered shape expanding away from the optical axis from the first portion of the inner side surface of the housing protruding portion toward the second housing end surface of the housing protruding portion.

5. The vehicular camera according to claim 1, wherein the flange protruding end surface of the flange protruding portion of the flange portion of the lens unit is welded to the first portion of the inner side surface of the housing protruding portion of the first end of the housing by a laser, and/or the second flange protruding surface of the flange protruding portion of the flange portion is welded to the first housing end surface of the first end of the housing by a laser.

6. The vehicular camera according to claim 1, wherein a part of the first flange surface of the flange portion of the lens unit is separated from the second housing end surface of the housing protruding portion of the first end of the housing with reference to the second end of the housing in the direction of the optical axis.

7. The vehicular camera according to claim 6, wherein the second housing end surface of the housing protruding portion of the first end of the housing is separated from an exposed surface of the resin member with reference to the second end of the housing in a direction along the optical axis.

8. The vehicular camera according to claim 1, wherein the flange portion of the lens unit includes at least three convex portions on the first flange surface, the at least three convex portions of the flange portion include a first convex portion, a second convex portion, and a third convex portion, and the first convex portion, the second convex portion, and the third convex portion are disposed around the first tubular portion of the lens unit.

9. The vehicular camera according to claim 8, wherein the flange portion of the lens unit has a first rectangle in a plan view of the flange portion, the first rectangle of the flange portion has at least a first corner, a second corner, a third corner, and a fourth corner, the first convex portion of the flange portion is located at a position corresponding to the first corner of the flange portion, the second convex portion of the flange portion is located at a position corresponding to the second corner of the flange portion, and the third convex portion of the flange portion is located at a position corresponding to the third corner of the flange portion.

10. The vehicular camera according to claim 1, wherein the first tubular portion of the lens unit and the flange portion of the lens unit are separate, and the lens unit is configured by coupling the first tubular portion and the flange portion at least.

11. The vehicular camera according to claim 1, wherein the first tubular portion of the lens unit is made of metal, and the first tubular portion of the lens unit and the flange portion are integrally formed.

12. The vehicular camera according to claim 1, wherein the flange portion of the lens unit includes at least a first protrusion, a second protrusion, and a third protrusion protruding from the second flange surface of the flange portion toward the first surface of the circuit board, the first protrusion of the flange portion and the first surface of the circuit board are bonded with a first adhesive, the second protrusion of the flange portion and the first surface of the circuit board are bonded with a second adhesive, and the third protrusion of the flange portion and the first surface of the circuit board are bonded with a third adhesive.

13. The vehicular camera according to claim 1, wherein the number of pixels of the imaging element is 3 mega or more and 15 mega or less, the housing includes four side walls that are formed continuously with the second end of the housing and extend from the second end toward the second flange surface of the lens unit, the four side walls are a first side wall, a second side wall, a third side wall, and a fourth side wall, the first side wall of the housing is connected to the second side wall of the housing, the second side wall of the housing is connected to the third side wall of the housing, the third side wall of the housing is connected to the fourth side wall of the housing, the fourth side wall of the housing is connected to the first side wall of the housing, and the vehicular camera includes a heat-conducting member located inside the second tubular portion of the housing and disposed between the second surface of the circuit board and the second end of the housing.

14. The vehicular camera according to claim 13, further comprising:

an electrical connector including a first connector end and a second connector end opposite to the first connector end, and a connector connection portion disposed on the second surface of the circuit board, wherein the electrical connector is disposed inside the second tubular portion of the housing, the first connector end of the electrical connector is electrically connected to the connector connection portion on the second surface of the circuit board, and the second connector end of the electrical connector is electrically connected to a cable of the vehicle when the vehicular camera is disposed in the vehicle.

15. The vehicular camera according to claim 14, wherein the first tubular portion of the lens unit has a circular shape in a plan view of the first tubular portion, the flange portion of the lens unit has a first rectangle in a plan view of the flange portion, the flange protruding portion of the lens unit has a second rectangle having a larger area than the first rectangle of the flange portion in a plan view of the flange protruding portion, and the second tubular portion of the housing has a third rectangle having a larger area than the first rectangle of the flange portion in a plan view of the second tubular portion.

* * * * *